United States Patent
Dawley

(10) Patent No.: US 10,569,634 B2
(45) Date of Patent: Feb. 25, 2020

(54) MULTI-FUNCTIONAL COOLING CHANNEL AND BUSBAR FOR BATTERY CELL PACK

(71) Applicant: GM GLOBAL TECHNOLOGY OPERATIONS LLC, Detroit, MI (US)

(72) Inventor: Evan J. Dawley, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 238 days.

(21) Appl. No.: 15/680,333

(22) Filed: Aug. 18, 2017

(65) Prior Publication Data

US 2019/0054814 A1    Feb. 21, 2019

(51) Int. Cl.

| | |
|---|---|
| *H01M 10/625* | (2014.01) |
| *B60K 6/28* | (2007.10) |
| *H01M 10/613* | (2014.01) |
| *H01M 10/647* | (2014.01) |
| *H01M 10/6556* | (2014.01) |
| *B60K 1/04* | (2019.01) |
| *H01M 10/0525* | (2010.01) |
| *B60K 1/00* | (2006.01) |

(52) U.S. Cl.
CPC .............. *B60K 6/28* (2013.01); *B60K 1/04* (2013.01); *H01M 10/0525* (2013.01); *H01M 10/613* (2015.04); *H01M 10/625* (2015.04); *H01M 10/647* (2015.04); *H01M 10/6556* (2015.04); *B60K 2001/005* (2013.01); *B60K 2001/0438* (2013.01); *B60Y 2200/92* (2013.01); *B60Y 2400/112* (2013.01); *H01M 2220/20* (2013.01); *Y10S 903/907* (2013.01)

(58) Field of Classification Search
None
See application file for complete search history.

(56) References Cited

U.S. PATENT DOCUMENTS

| | | | | |
|---|---|---|---|---|
| 2013/0108897 A1* | 5/2013 | Christian | ............ | H01M 10/625 429/50 |
| 2013/0122339 A1* | 5/2013 | Chae | ................... | H01M 10/625 429/99 |
| 2013/0323549 A1* | 12/2013 | Choi | ................... | H01M 2/1016 429/62 |
| 2014/0154547 A1* | 6/2014 | Anderson | ......... | H01M 10/0413 429/120 |

* cited by examiner

*Primary Examiner* — Eli S Mekhlin
(74) *Attorney, Agent, or Firm* — Quinn IP Law

(57) ABSTRACT

A prismatic battery stack includes a first lithium-ion battery cell and a second lithium-ion battery cell. The battery stack also includes a first channel disposed around the first lithium-ion battery cell and the second lithium-ion battery cell. The battery stack includes a second channel disposed around the first lithium-ion battery cell and the second lithium-ion battery cell. The first channel and the second channel serve as heat sinks.

18 Claims, 19 Drawing Sheets

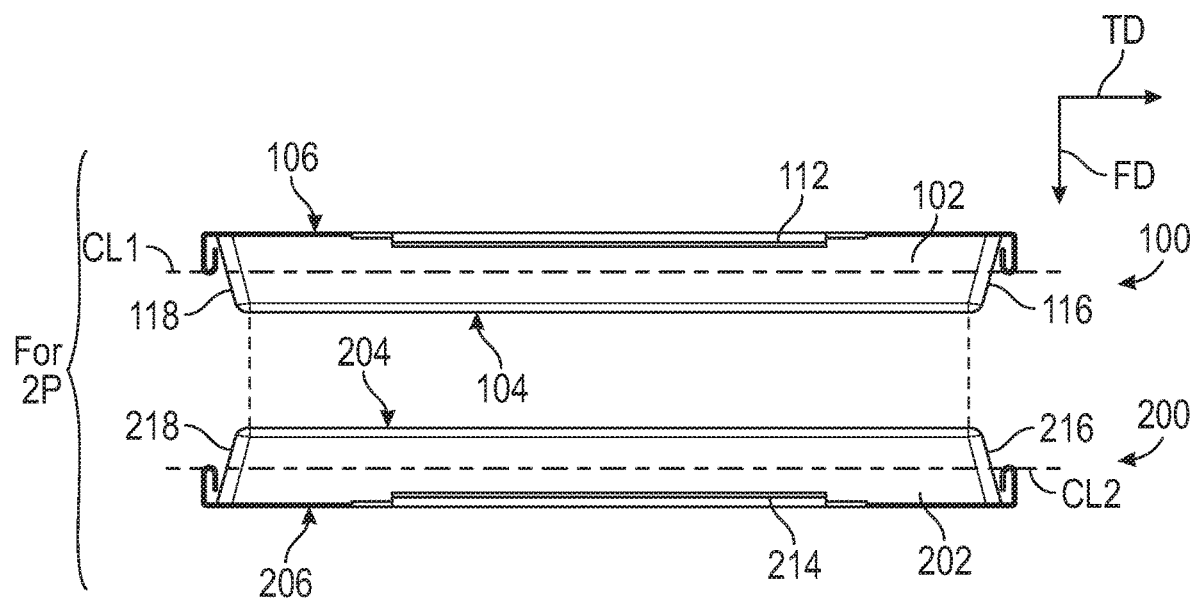
FIG. 4B
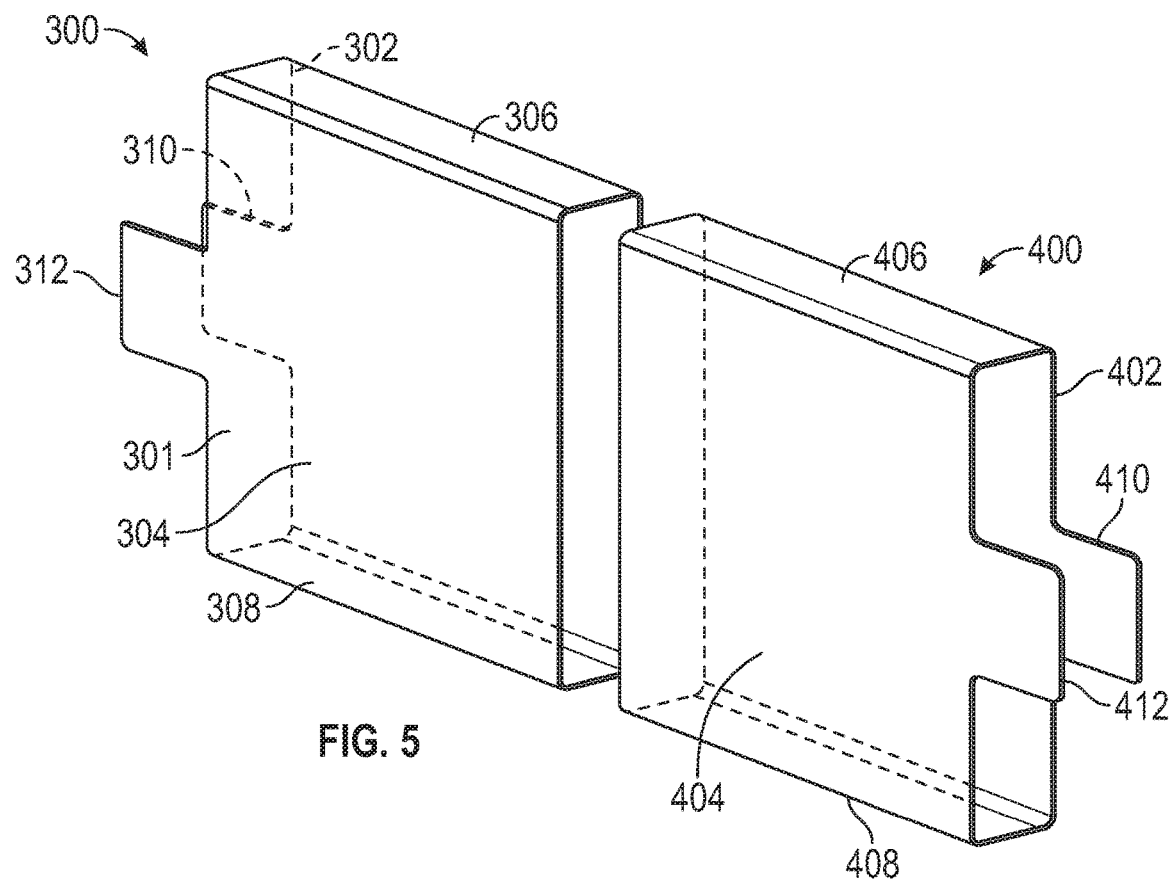
FIG. 5
FIG. 6

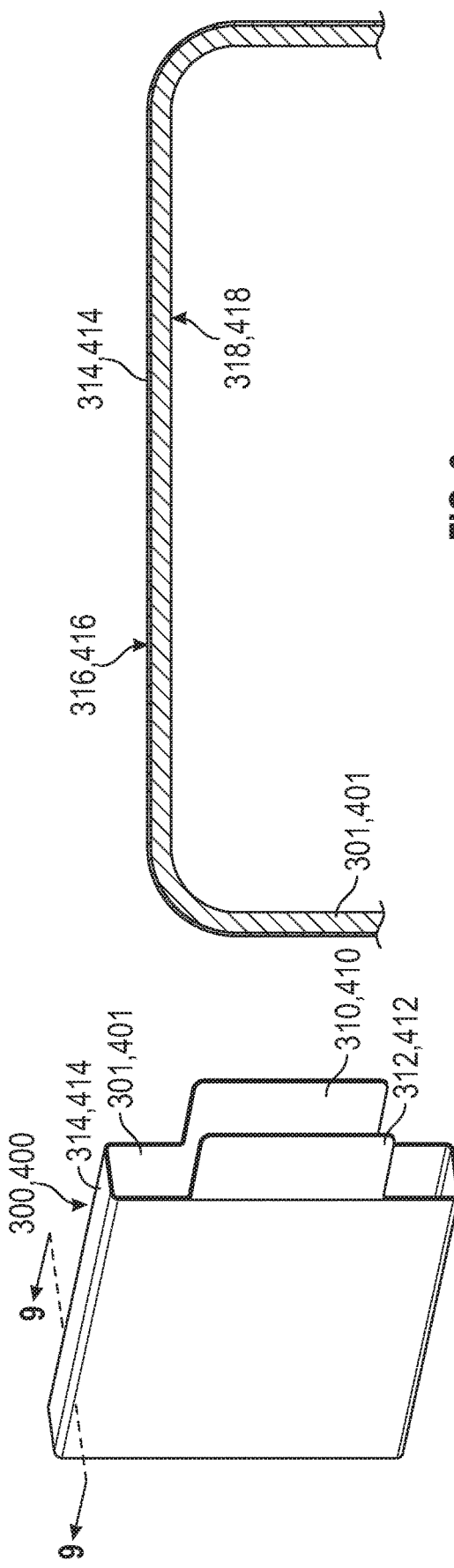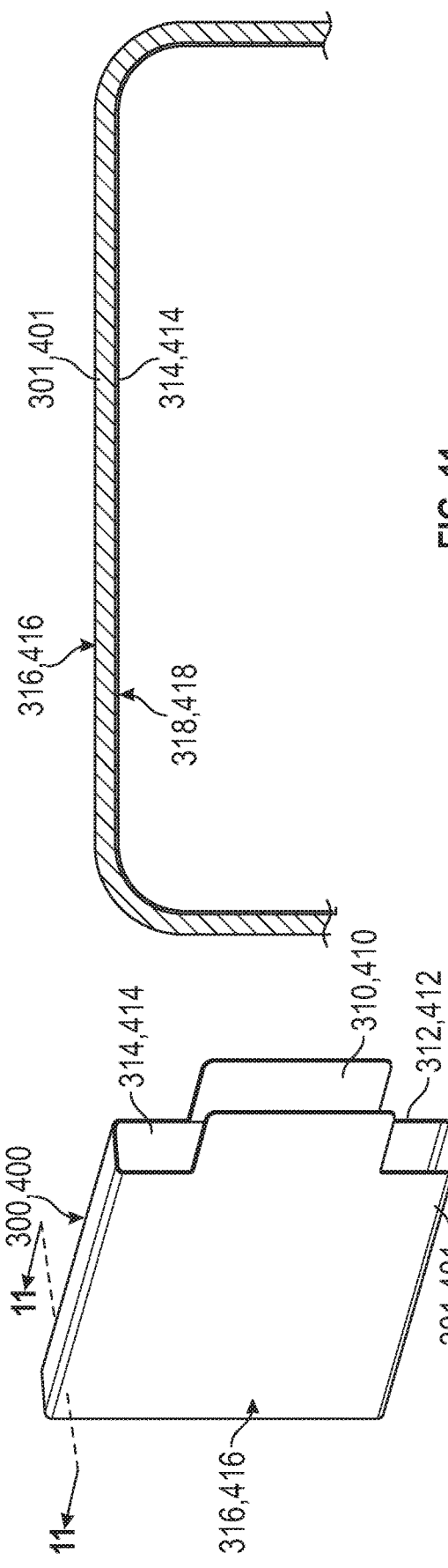

MULTI-FUNCTIONAL COOLING CHANNEL AND BUSBAR FOR BATTERY CELL PACK

INTRODUCTION

The present disclosure relates to a multi-functional cooling channel and busbar for a battery cell pack.

Lithium-based batteries are being used in automotive and related transportation applications as a way to supplement, in the case of hybrid electric vehicles (HEVs), or supplant, in the case of purely electric vehicles (EVs), conventional internal combustion engines (ICEs). The ability to passively store energy from stationary and portable sources, as well as from recaptured kinetic energy provided by the vehicle and its components, makes such batteries ideal to serve as part of a propulsion system for cars, trucks, buses, motorcycles and related vehicular platforms. The flow of electric current to and from the individual cells (i.e., a single electrochemical unit) is such that when several such cells are combined into successively larger assemblies (such as modules and packs), the current or voltage can be increased to generate the desired power output. In the present context, larger module and pack assemblies are made up of one or more cells joined in series (for increased voltage), parallel (for increased current) or both, and may include additional structure to ensure proper installation and operation of these cells. One vehicular form of the battery pack is known as a power battery, while another is known as an energy battery. In the power battery pack variant, the individual cells that make up a battery pack are configured as prismatic (i.e., rectangular) cans that define a rigid outer housing known as a cell case. In the energy battery pack variant, the individual cells are housed in a thinner, flexible prismatic pouch.

SUMMARY

The present disclosure describes a multi-functional cooling channel and busbar for a battery cell stack. Certain battery systems require high current busbars to electrically interface to the battery cell and a cooling channel to thermally interface with the battery cell. The presently disclosed battery stack includes a multi-functional cooling channel/busbar that serves to thermally transfer heat from both the battery cell face and from the cell tabs while electrically acting as a high current bus. The multi-functional cooling channel turns a prismatic pouch-type cell stack into a prismatic can-type cell stack, thus enabling one-sided electrical bussing and cell voltage sensing connection. For a P-type cell with asymmetric cell tabs, the battery cell stack uses two battery cell part numbers to enable more streamlined integration of bussing and sensing, thus reducing complexity of the section assembly components and complexity of the manufacturing system (i.e., cell-specific tab bending is not required). For the N-type cell, the batter cell solely requires a single cell part number due to the cell being reversible. Therefore, the presently disclosed battery cell stack reduces the number of components required to interconnect cell groups for bussing or sensing. It also allows for better thermal performance of the battery system through tab cooling and face cooling and enables smaller packing space for more versatile pack integration (flat packs v. tunnel packs). The combination of functions (i.e., thermal/electrical) into one component (i.e., the channel) least to better thermal characteristics and more cost-effective integration. The unique design of the battery stack allows for versatility. For the N-type cell, soley one channel design is needed. For the P-type cell, two different channel designs are needed. However, the design approach allows the same electrical connections to be used from the top of module (regardless of whether the module uses N-type or P-type cells). For example, a 2P N-type cell module assembly and 2P P-type cell module assembly can use exact same electronic interfaces (likewise for the 4P layout). All channels may be configured as sleeves.

In some embodiments, the prismatic battery stack includes a first lithium-ion battery cell. The first lithium-ion battery cell includes a first containment defining a first inner-containment surface and a first outer-containment surface opposite the first inner-containment surface. The first containment includes a first cathode tab protruding out from the first containment and a first anode tab protruding out from the first containment. The battery stack further includes a second lithium-ion battery cell electrically connected to the first lithium-ion battery cell. The second lithium-ion battery cell includes a second containment defining a second inner-containment surface and a second outer-containment surface opposite the second inner-containment surface. The second lithium-ion battery cell further includes a second cathode tab protruding out from the second containment. The second battery cell further includes a second anode tab protruding out from the second containment. The battery stack also includes a first channel disposed around the first lithium-ion battery cell and the second lithium-ion battery cell. The battery stack includes a second channel disposed around the first lithium-ion battery cell and the second lithium-ion battery cell. The first channel serves as a first heat sink to allow heat transfer from both the first lithium-ion battery cell and the second lithium-ion battery cell to the first channel. The second channel serves as a second heat sink to allow heat transfer from both the first lithium-ion battery cell and the second lithium-ion battery cell to the second channel. The first channel serves as a first busbar to electrically connect the first cathode tab of the first lithium-ion battery cell to the second cathode tab of the second lithium-ion battery cell. The second channel serves as a second busbar to electrically connect the first anode tab of the first lithium-ion battery cell to the second anode tab of the second lithium-ion battery cell.

The first channel includes a first outer sidewall, a first inner sidewall, a first top wall directly interconnecting the first outer sidewall and the first inner sidewall, and a first bottom wall directly interconnecting the first outer sidewall and the first inner sidewall, the first top wall is perpendicular to the first outer sidewall. The first top wall is perpendicular to the first inner sidewall, the first bottom wall is perpendicular to the first outer sidewall, and the first bottom wall is perpendicular to the first inner sidewall. The first channel further includes a first outer tab and a first inner tab, the first inner tab protrudes directly from the first inner sidewall, the first outer tab protrudes directly from the first outer sidewall, and the first inner tab is parallel to the first outer tab.

The first outer tab is directly connected to the first cathode tab of the first lithium-ion battery cell to electrically connect the first cathode tab of the first lithium-ion battery cell to the first channel. The first inner tab is directly connected to the second cathode tab of the second lithium-ion battery cell to electrically connect the second cathode tab of the second lithium-ion battery cell to the first channel. The second lithium-ion battery cell is spaced apart from the first lithium-ion battery cell along a first direction. The entire second channel is spaced apart from an entirety of the first channel along a second direction. The second direction is perpendicular to the first direction. The first top wall is spaced apart from the first bottom wall along a third direction. The third direction is perpendicular to the first direction. The third direction is perpendicular to the second direction. The first anode tab is spaced apart from the first cathode tab along the second direction. The second anode tab is spaced apart from the second cathode tab along the second direction. The first inner sidewall is spaced apart from the first outer sidewall along the first direction. The first inner tab is spaced apart from the first outer tab along the second direction.

The second channel includes a second outer sidewall, a second inner sidewall, a second top wall directly interconnecting the second outer sidewall and the second inner sidewall, and a second bottom wall directly interconnecting the second outer sidewall and the second inner sidewall. The second top wall is perpendicular to the second outer sidewall. The second top wall is perpendicular to the second inner sidewall. The second bottom wall is perpendicular to the second outer sidewall. The second bottom wall is perpendicular to the second inner sidewall.

The second channel further includes a second inner tab and a second outer tab, the second inner tab protrudes directly from the second inner sidewall, the second outer tab protrudes directly from the second outer sidewall. The second inner tab is parallel to the first outer tab. The second outer tab is directly connected to the first anode tab of the first lithium-ion battery cell to electrically connect the first anode tab of the first lithium-ion battery cell to the second channel. The second inner tab is directly connected to the second anode tab of the second lithium-ion battery cell to electrically connect the second anode tab of the second lithium-ion battery cell to the second channel.

The first outer sidewall of the first channel is closer to the first outer-containment surface of the first lithium-ion battery cell than to the second outer-containment surface of the second lithium-ion battery cell to facilitate heat transfer from the second lithium-ion battery cell to the first channel. The second outer sidewall of the second channel is closer to the second outer-containment surface of the second lithium-ion battery cell than to the second outer-containment surface of the second lithium-ion battery cell to facilitate heat transfer from the second lithium-ion battery cell to the second channel The first inner sidewall of the first channel is closer to the first outer-containment surface of the first lithium-ion battery cell than to the second outer-containment surface to facilitate heat transfer from the first battery to the first channel. The second inner sidewall of the second channel is closer to the second outer-containment surface of the second lithium-ion battery cell than to the first outer-containment surface of the first lithium-ion battery cell to facilitate heat transfer from the second lithium-ion battery cell to the second channel, the first top wall. The first bottom wall. The first outer sidewall and the first inner sidewall collectively define a first channel body. The first channel further includes a first electrical-insulation film coupled to the first channel body. The second top wall, the second bottom wall, the second outer sidewall and the second inner sidewall collectively define a second channel body. The second channel further includes a second electrical-insulation film coupled to the second channel body. The first channel is characterized by the absence of the first electrical-insulation film on the first outer tab and the first inner tab, and the second channel is characterized by the absence of the second electrical-insulation film on the second outer tab and the second inner tab.

In some embodiments, the second lithium-ion battery cell is spaced apart from the first lithium-ion battery cell along the first direction. The first channel includes a first outer sidewall, a first inner sidewall, a first top wall directly interconnecting the first outer sidewall and the first inner sidewall, and a first bottom wall directly interconnecting the first outer sidewall and the first inner sidewall. The first top wall is perpendicular to the first outer sidewall. The first top wall is perpendicular to the first inner sidewall. The first bottom wall is perpendicular to the first outer sidewall, and the first bottom wall is perpendicular to the first inner sidewall. The second channel includes a second outer sidewall, a second inner sidewall, a second top wall directly interconnecting the second outer sidewall and the second inner sidewall, and a second bottom wall directly interconnecting the second outer sidewall and the second inner sidewall. The second top wall is perpendicular to the second outer sidewall, the second top wall is perpendicular to the second inner sidewall. The second bottom wall is perpendicular to the second outer sidewall. The second bottom wall is perpendicular to the second inner sidewall. The second top wall is spaced apart from the first top wall along a second direction. The second direction is perpendicular to the first direction. The first cathode tab is spaced apart from the first anode tab along the third direction, and the third direction is perpendicular to the first direction. The third direction is perpendicular to the second direction, and the second cathode tab is spaced apart from the second anode tab along the third direction.

The first inner sidewall defines a first upper end and a first lower end opposite the first upper end, the first upper end of the first inner sidewall is directly coupled to the first top wall, the first lower end is directly coupled to the first bottom wall, the first channel has a first maximum height defined from the first upper end to the first lower end of the first inner sidewall along the third direction. The second inner sidewall defines a second upper end and a second lower end opposite the second upper end. The second upper end of the second inner sidewall is directly coupled to the second top wall. The second channel defines a second maximum height defined from the second upper end of the second inner sidewall to the second lower end of the second inner sidewall along the third direction. The first maximum height is greater than the second maximum height.

The first inner sidewall has a first rear end and a first front end opposite the first rear end. The first front end is spaced apart from the first rear end along the second direction. The first channel defines a first maximum length defined from the first rear end of the first inner sidewall to the first front end of the first inner sidewall along the second direction. The second inner sidewall has a second rear end and a second front end opposite the second rear end. The second front end is spaced apart from the second rear end along the second direction. The second channel has a second maximum length defined from the second rear end of the second inner sidewall to the second rear end of the second inner sidewall along the second direction. The first maximum length is greater than the second maximum length.

The second rear end of the second inner sidewall is spaced apart from the first rear end of the first inner sidewall along the second direction. The second front end of the second inner sidewall is spaced apart from the first front end of the first inner sidewall along the third direction. The second front end of the second inner sidewall is not spaced apart from the first front end of the first inner sidewall along the second direction. The first channel further includes a first outer tab and a first inner tab, the first inner tab protrudes directly from the first inner sidewall, the first outer tab protrudes directly from the first outer sidewall, the first inner tab is parallel to the first outer tab, the first outer tab is directly connected to the first cathode tab of the first lithium-ion battery cell to electrically connect the first cathode tab of the first lithium-ion battery cell to the first channel. The first inner tab is directly connected to the second cathode tab of the second lithium-ion battery cell to electrically connect the second cathode tab of the second lithium-ion battery cell to the first channel. The second channel includes a second inner tab and a second outer tab. The second inner tab protrudes directly from the second inner sidewall. The second outer tab protrudes directly from the second outer sidewall, and the second inner tab is parallel to the first outer tab. The second outer tab is directly connected to the first anode tab of the first lithium-ion battery cell to electrically connect the first anode tab of the first lithium-ion battery cell to the second channel. The second inner tab is directly connected to the second anode tab of the second lithium-ion battery cell to electrically connect the second anode tab of the second lithium-ion battery cell to the second channel. The first outer tab is spaced apart from the first inner tab along the first direction, the second outer tab is spaced apart from the second inner tab along the second direction, the second outer tab is spaced apart from the first outer tab along the third direction, and the second inner tab is spaced apart from the first inner tab along the third direction. The second lower end of the second inner sidewall is spaced apart from the first lower end of the first inner sidewall along the third direction.

The present disclosure also relates to vehicles. In some embodiments, the vehicle includes a plurality of wheels, an electric motor coupled to at least one of the plurality of wheels, and a prismatic battery pack electrically connected to the electric motor. The prismatic battery pack includes a first lithium-ion battery cell. The first lithium-ion battery cell includes a first containment defining a first inner-containment surface and a first outer-containment surface opposite the first inner-containment surface. The first lithium-icon battery cell includes a first cathode tab protruding out from the first containment and a first anode tab protruding out from the first containment. The vehicle further includes a second lithium-ion battery cell electrically connected to the first lithium-ion battery cell. The second lithium-ion battery cell includes a second containment defining a second inner-containment surface and a second outer-containment surface opposite the second inner-containment surface. The second lithium-ion battery cell includes second cathode tab protruding out from the second containment. The second lithium-ion battery cell includes a second anode tab protruding out from the second containment. The vehicle further includes a first channel disposed around the first lithium-ion battery cell and the second lithium-ion battery cell, and a second channel disposed around the the first lithium-ion battery cell and the second lithium-ion battery cell. The first channel serves as a first heat sink to allow heat transfer from both the first lithium-ion battery cell and the second lithium-ion battery cell to the first channel. The second channel serves as a second heat sink to allow heat transfer from both the first lithium-ion battery cell and the second lithium-ion battery cell to the second channel. The first channel serves as a first busbar to electrically connect the first cathode tab of the first lithium-ion battery cell to the second cathode tab of the second lithium-ion battery cell. The second channel serves as a second busbar to electrically connect the first anode tab of the first lithium-ion battery cell to the second anode tab of the second lithium-ion battery cell. The first channel includes a first outer sidewall, a first inner sidewall, a first top wall directly interconnecting the first outer sidewall and the first inner sidewall, and a first bottom wall directly interconnecting the first outer sidewall and the first inner sidewall. The first top wall is perpendicular to the first outer sidewall. The first top wall is perpendicular to the first inner sidewall. The first bottom wall is perpendicular to the first outer sidewall, and the first bottom wall is perpendicular to the first inner sidewall. The first channel further includes a first outer tab and a first inner tab, the first inner tab protrudes directly from the first inner sidewall. The first outer tab protrudes directly from the first outer sidewall, and the first inner tab is parallel to the first outer tab. The first outer tab is directly connected to the first cathode tab of the first lithium-ion battery cell to electrically connect the first cathode tab of the first lithium-ion battery cell to the first channel.

The present disclosure also describes method. The method includes: comprising: (a) placing a first channel around a first lithium-ion battery cell and a second lithium-ion battery cell; and (b) placing a second channel around the first lithium-ion battery cell and the second lithium-ion battery cell. The first channel serves as a first heat sink to allow heat transfer from both the first lithium-ion battery cell and the second lithium-ion battery cell to the first channel. The second channel serves as a second heat sink to allow heat transfer from both the first lithium-ion battery cell and the second lithium-ion battery cell to the second channel.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 4B is a schematic exploded front view a battery pack including the first lithium-ion battery cell and the second lithium-ion battery cell for a 2P configuration FIG. 5 is a schematic perspective view of a first channel.

FIG. 6 is a schematic perspective view of a second channel.

FIG. 8 is a schematic perspective view of either the first channel or the second channel, including an electrical-insulation film disposed on an outer surface thereof.

FIG. 9 is a schematic cross-sectional view of either the first channel or the second channel, taken along section line 9-9 of FIG. 8.

FIG. 10 is a schematic perspective view of either the first channel or the second channel, including an electrical-insulation film disposed on an inner surface thereof.

FIG. 11 is a schematic cross-sectional view of either the first channel or the second channel, taken along section line 11-11 of FIG. 10.

DETAILED DESCRIPTION

Figure 1:
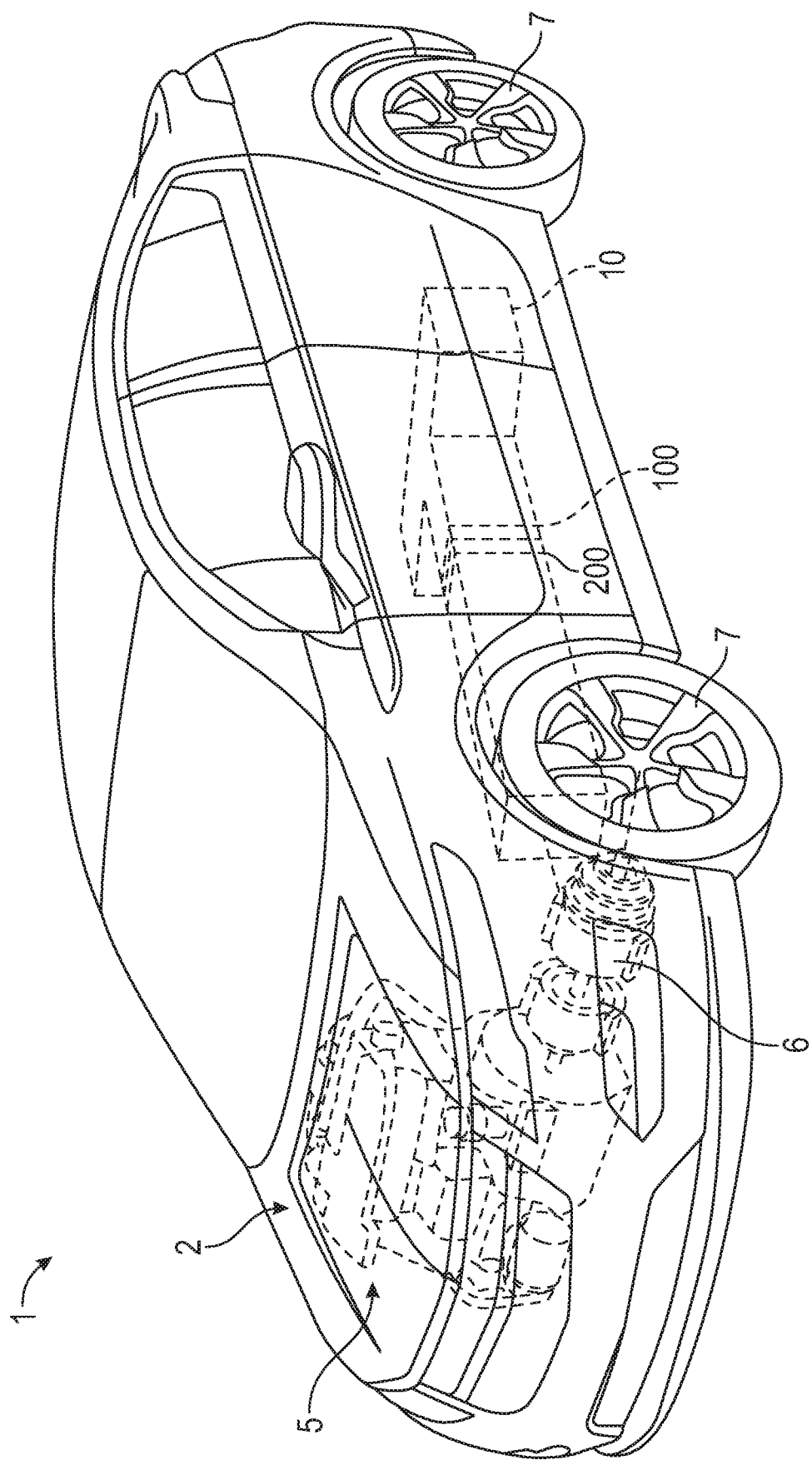
FIG. 1 is a schematic perspective view of a vehicle with a hybrid propulsion system in the form of a battery pack and an internal combustion engine.

FIG. 1 schematically illustrates a vehicle 1 including a hybrid propulsion system 2 in the form of an electric power source made up of an internal combustion engine (ICE) 5 and a prismatic battery pack 10, both cooperative with one or more electric motors 6 and transmission (for example, in the form of a planetary gear set) that makes up a drivetrain. Such a vehicle is known as a hybrid electric vehicle (HEV).

In particular, the prismatic battery pack 10 is electrically connected to the electric motor 6 to allow the flow of electricity between the prismatic battery pack 10 and the electric motor. It will be appreciated that the vehicle 1 may not require an ICE 5; in such case, rather than being an HEV, the vehicle 1 is an electric vehicle (EV). The prismatic battery pack 10 may either be in the power battery pack or energy battery pack form, the particular variant becoming apparent from the context. Additional drivetrain components useful in providing propulsive power to one or more of the wheels 7 and coupled to one or both of the prismatic battery pack 10 and the ICE 5 are understood to include rotating shafts, axles, controllers or the like. The electric motor 6 is coupled to at least one of the wheels 7 to propel the vehicle 1. While the vehicle 1 is presently shown as a car, the hybrid propulsion system 2 may be incorporated to other types of vehicles (including trucks, buses, aircraft, watercraft, spacecraft and motorcycles). Further, the prismatic battery pack 10 may be used in non-automotive applications.

With continued reference to FIG. 1, the prismatic battery pack 10 is the electric current source for vehicle 1, and is in the form of numerous prismatic lithium-ion battery cells (e.g., the first lithium-ion battery cell 100 and the second lithium-ion battery cell 200) that are aligned in a facing arrangement (much like a deck of cards) along stacking direction. A group of numerous individual battery cells 100 may be grouped within larger units called modules that are in turn placed with an enclosure to define the battery pack 10. Other equipment for integration of the prismatic battery pack 10 into the vehicle 1 may include (among others) a battery system monitor (BSM) unit and a manual service disconnect (MSD) unit, as well as a battery disconnect unit (BDU) and ancillary structure for electrical control, structural support, cooling, electrical connectivity (via busbars and cables, for example) or the like.

Figure 2:
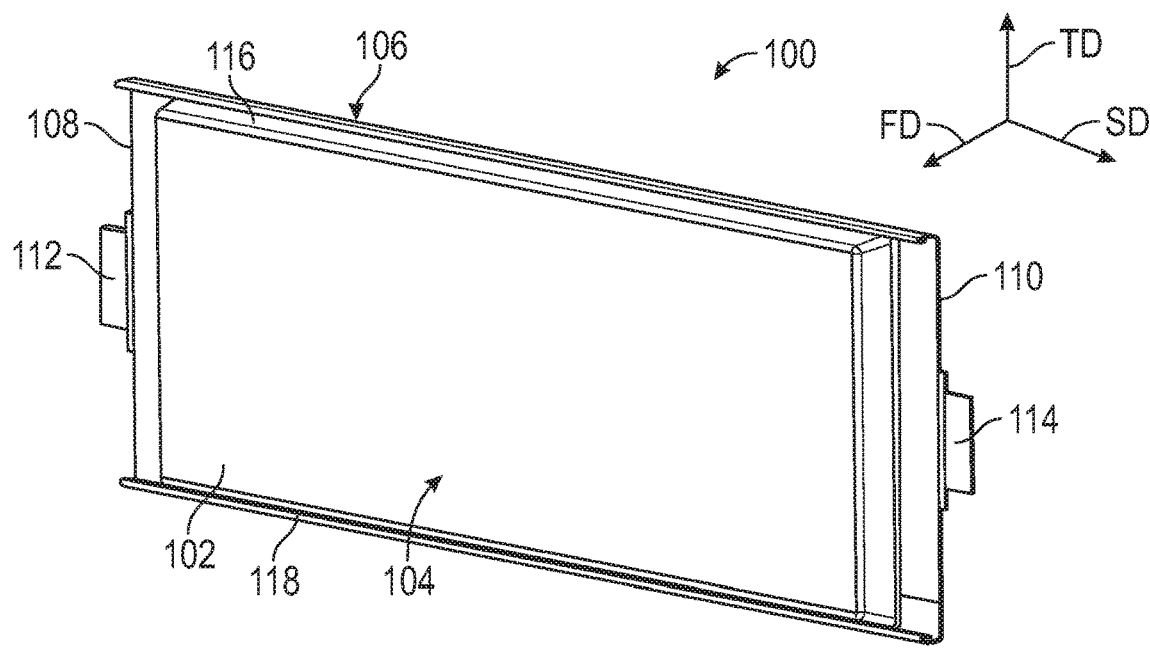
FIG. 2 is a schematic perspective view of a first lithium-ion battery cell.

With reference to FIG. 2, in the energy battery form shown, the individual prismatic battery pack 10 includes at least two prismatic battery cells (i.e., the first lithium-ion battery cell 100 and the second lithium-ion battery cell 200). It is contemplated, however, that the battery pack 10 may include more than two battery cells. Each of the first lithium-ion battery cell 100 and the second lithium-ion battery cell 200 is configured as a rectangular (i.e., prismatic) pouch.

Figure 3:
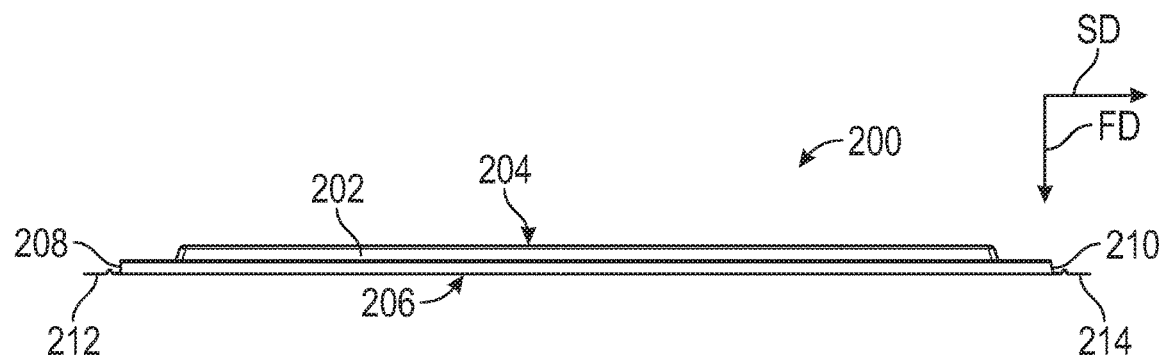
FIG. 3 is a schematic top view of a second lithium-ion battery cell.
Figure 4A:
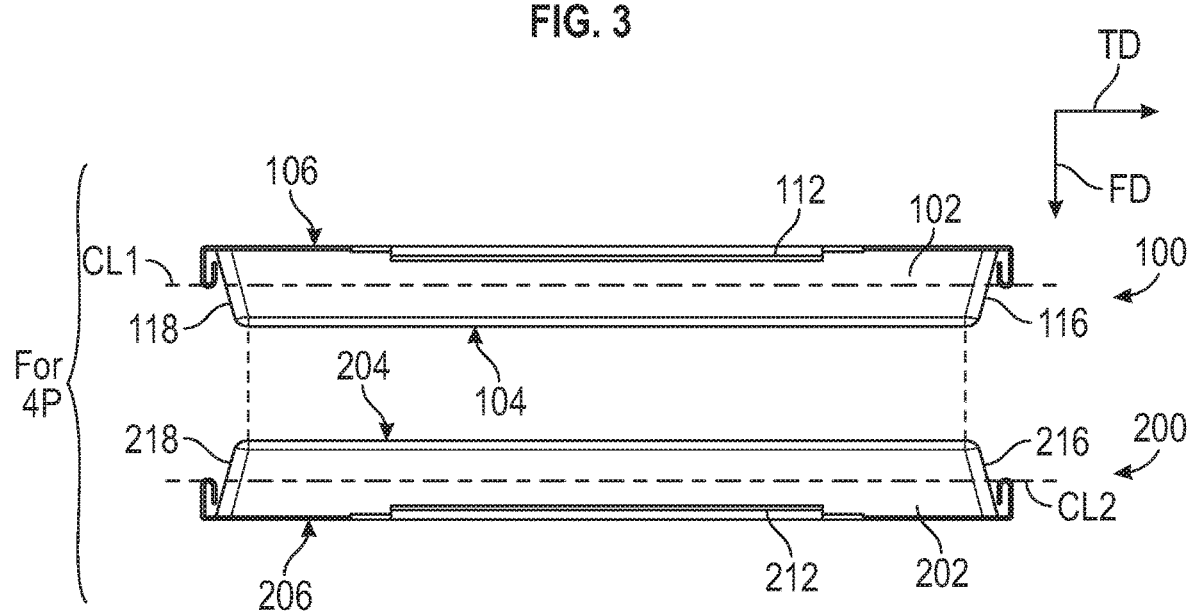
FIG. 4A is a schematic exploded front view a battery pack including the first lithium-ion battery cell and the second lithium-ion battery cell for a 4P configuration.

With reference to FIGS. 2-4, the first lithium-ion battery cell 100 is mirror image of the second lithium-ion battery cell 200, thereby eliminating the need to bend the tabs. Thus, except for the orientation in the battery pack 10, the structural features of the first lithium-ion battery cell 100 and the second lithium-ion battery cell 200 are identical. Also, the first lithium-ion battery cell 100 and the second lithium-ion battery cell 200 are the same size. The first lithium-ion battery cell 100 includes a first containment 102 defining a first inner-containment surface 104 and a first outer-containment surface 106 opposite the first inner-containment surface 104. The first inner-containment surface 104 is spaced apart from the first outer-containment surface 106 along a first direction FD. Further, the first inner-containment surface 104 and the first outer-containment surface 106 are each planar to facilitate stacking to form the prismatic battery pack 10. The first containment 102 has a first rear edge 108 and a first front edge 110 opposite the first rear edge 108. The first lithium-ion battery cell 100 further includes a first cathode tab 112 protruding out from the first containment 102 and a first anode tab 114 protruding out from the first containment 102. The first cathode tab 112 is made of an electrically-conductive material, such as aluminum, and serves as a positive terminal. The second anode tab 214 is made of an electrically-conductive material, such as a copper, and serves as a negative terminal. Thus, the first cathode tab 112 and the first anode tab 114 act as electrical contacts for connection (via busbar, for example) to an outside load or circuit. In the depicted embodiment, the first cathode tab 112 and the first anode tab 114 protrude from opposite sides of the first containment 102, and the battery cell 100 is referred to as a N-type cell. Therefore, the first cathode tab 112 is closer to the first rear edge 108 than to the first front edge 110 of the first containment 102, and the first anode tab 114 is closer to the first front edge 110 than to the first rear edge 108 of the first containment 102. The cathode 112 protrudes from the rear edge 108, and anode 114 protrudes from the front edge 110. The location of the first cathode tab 112 and the first anode tab 114 is dictated by the space available within the automotive environment, as well as preferred placement of the current-collecting busbars or related power cabling. The first cathode tab 112 is spaced apart from the first anode tab 114 along a second direction SD. The second direction SD is perpendicular to the first direction FD. Each of the first inner-containment surface 104 and the first outer-containment surface 106 are elongated along the second direction SD. The first cathode tab 112 and the first anode tab 114 are offset from a first centerline CL1 of the first lithium-ion battery cell 100 along the first direction FD. As such, the first cathode tab 112 and the first anode tab 114 are both closer to the first outer-containment surface 106 than to the first inner-containment surface 104. The first containment 102 further includes a first top-containment wall 116 and a first bottom-containment wall 118 opposite the first top-containment wall 116. The first top-containment wall 116 is coupled between the first inner-containment surface 104 and the first outer-containment surface 106. The first bottom-containment wall 118 is coupled between the first inner-containment surface 104 and the first outer-containment surface 106. The first top-containment wall 116 is spaced apart from the top bottom-containment wall 118 along a third direction TD. The third direction TD is perpendicular to the first direction FD and the second direction SD.

With reference to FIGS. 2-4, the second lithium-ion battery cell 200 includes a second containment 202 defining a second inner-containment surface 204 and a second outer-containment surface 206 opposite the second inner-containment surface 104. The second inner-containment surface 204 is spaced apart from the second outer-containment surface 206 along the first direction FD. Further, the second inner-containment surface 204 and the second outer-containment surface 206 are each planar to facilitate stacking to form the prismatic battery pack 10. The second containment 202 has a second rear edge 208 and a second front edge 210 opposite the second rear edge 208. The second lithium-ion battery cell 200 further includes a second cathode tab 212 protruding out from the second containment 202 and a second anode tab 214 protruding out from the second containment 202. The second cathode tab 212 is made of an electrically-conductive material, such as aluminum, and serves as a positive terminal. The second anode tab 214 is made of an electrically-conductive material, such as a copper, and serves as a negative terminal. Thus, the second cathode tab 212 and the second anode tab 214 act as electrical contacts for connection (via busbar, for example) to an outside load or circuit. In the depicted embodiment, the second cathode tab 212 and the second anode tab 214 protrude from opposite sides of the second containment 202, and the battery cell 100 is referred to as a N-type cell. Therefore, the second cathode tab 212 is closer to the second rear edge 208 than to the second front edge 210 of the second containment 202, and the second anode tab 212 is closer to the second front edge 210 than to the second rear edge 208 of the second containment 202. The second cathode tab 212 is spaced apart from the second anode tab 214 along the second direction SD. Each of the second inner-containment surface 204 and the second outer-containment surface 206 are elongated along the second direction SD. The second cathode tab 212 and the first anode tab 214 are offset from a second centerline CL2 of the second lithium-ion battery cell 200 along the first direction FD. As such, the second cathode tab 212 and the second anode tab 214 are both closer to the second outer-containment surface 206 than to the second inner-containment surface 204. The second containment 202 further includes a second top-containment wall 216 and a second bottom containment wall 218 opposite the second top containment wall 216. The second top-containment wall 116 is coupled between the second inner-containment surface 204 and the second outer-containment surface 206. The second bottom containment wall 218 is coupled between the second inner-containment surface 204 and the second outer-containment surface 206. The second top containment wall 216 is spaced apart from the second bottom containment wall 218 along the third direction TD.

Figure 7:
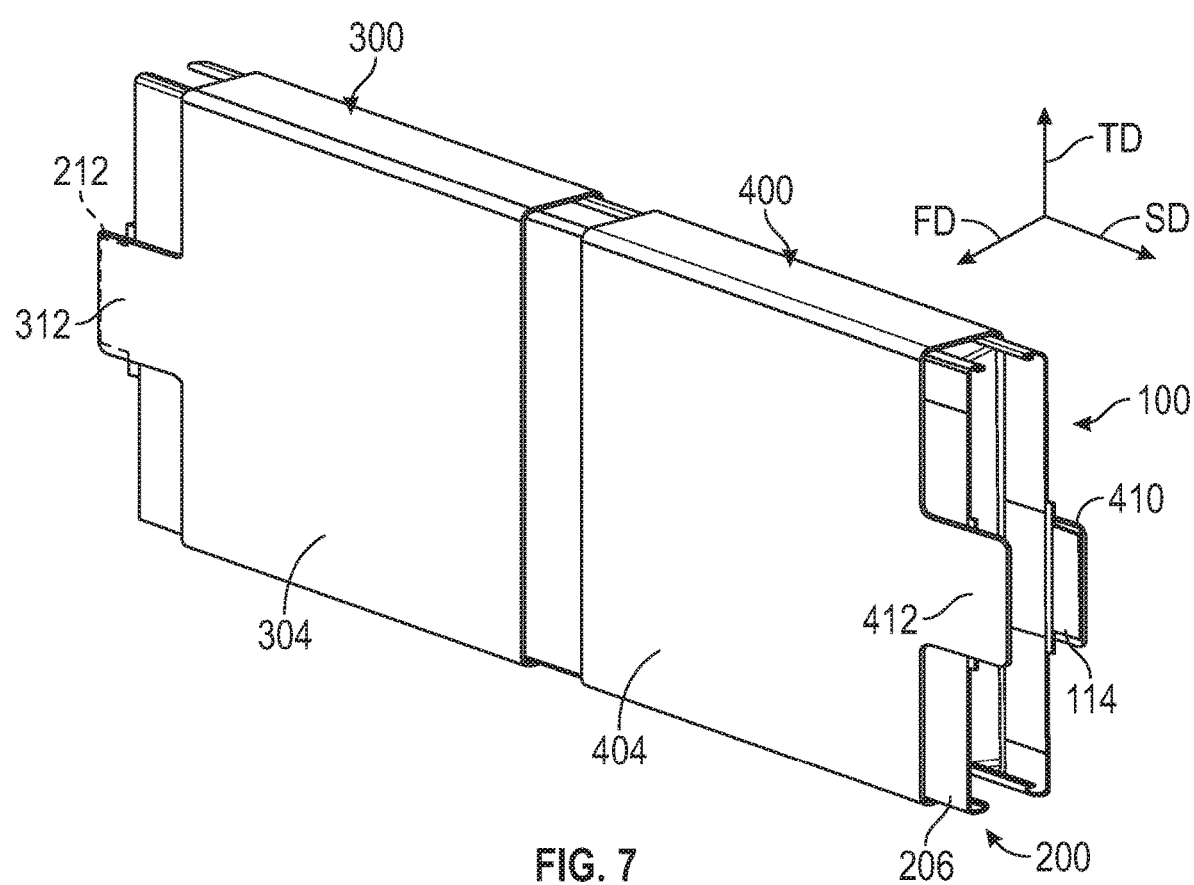
FIG. 7 is a schematic perspective view of the first lithium-ion battery cell, the second lithium-ion battery cell, the first channel, and the second channel assembled together, wherein the cell tabs are not necessarily welded (but they could be), and the cell tabs are not typically welded until the full module stack is completed.

With reference to FIGS. 5-7, the prismatic battery stack 10 further includes a first channel 300 disposed around the first lithium-ion battery cell 100 and the second batter cell 200. The first channel 300 is wholly or partly made of a thermally and electrically conductive material, such as a metal, to serve as a heat sink (i.e., the first heat sink) to allow heat transfer from both the first lithium-ion battery cell 100 and the second lithium-ion battery cell 200 to the first channel 300. In other words, the first channel 300 allows heat transfer from the cell faces and the cell tabs of the first lithium-ion battery cell 100 and the second lithium-ion battery cell 200 to the first channel 300. For the 4P configuration, the first channel 300 also serves as a first busbar to electrically connect the first cathode tab 112 of the first lithium-ion battery cell 100 to the second cathode tab 212 of the second lithium-ion battery cell 200. For the 2P configuration, the first channel 300 also serves as a busbar (i.e., the first busbar) to electrically connect the first cathode tab 112 of the first lithium-ion battery cell 100 to the second anode tab 214 of the second lithium-ion battery cell 200. The first channel 300 includes a first outer sidewall 302, a first inner sidewall 304, a first top wall 306 directly interconnecting the first outer sidewall 302 and the first inner sidewall 304, and a first bottom wall 308 directly interconnecting the first outer sidewall 302 and the first inner sidewall 304. The first top wall 306 is perpendicular to the first outer sidewall 302. The first top wall 306 is perpendicular to the first inner sidewall 304. The first bottom wall 308 is perpendicular to the first outer sidewall 302. The first bottom wall 308 is perpendicular to the first inner sidewall 304. The first channel 300 further includes a first outer tab 310 and a first inner tab 312. The first inner tab 312 protrudes directly from the first inner sidewall 304. The first outer tab 310 protrudes directly from the first outer sidewall 302. The first inner tab 310 is parallel to the first outer tab 312. For the 4P configuration, the first outer tab 310 is directly connected to the first cathode tab 112 of the first lithium-ion battery cell 100 to electrically connect the first cathode tab 112 of the first lithium-ion battery cell 100 to the first channel 300. The first inner tab 312 is directly connected to the second cathode tab 212 of the second lithium-ion battery cell 200 to electrically connect the second cathode tab 212 of the second lithium-ion battery cell 200 to the first channel 100. For the 2P configuration, the outer tab 310 is connected to cathode 112 and inner tab 312 would be connected to anode 214. The first outer sidewall 302 of the first channel 300 is closer to the first outer-containment surface 106 of the first lithium-ion battery cell 100 than to the second outer-containment surface 206 of the second lithium-ion battery cell 200 to facilitate heat transfer from the first lithium-ion battery cell 100 to the first channel 300.

The prismatic battery stack 10 further includes a second channel 400 disposed around the first lithium-ion battery cell 100 and the second battery cell 200. The second channel 400 is wholly or partly made of a thermally and electrically conductive material, such as a metal, to serve as a heat sink (i.e., the second heat sink) to allow heat transfer from both the first lithium-ion battery cell 100 and the second lithium-ion battery cell 200 to the second channel 400. In other words, the second channel 400 allows heat transfer from the cell faces and the cell tabs of the first lithium-ion battery cell 100 and the second lithium-ion battery cell. In the 4P configuration, the channel 300 provides cooling interface to the cathode tabs (112 and 212) and the channel 400 provides cooling interface to the anode tabs (114 and 214) along with the cell faces. For the 2P configuration, the channels 300 and 400 are staggered in direction FD in the module. (i.e., channel 300 interfaces with both cathode and anode and channel 400 interfaces with the opposing anode and cathode).

The second lithium-ion battery cell 200 is spaced apart from the first lithium-ion battery cell 100 along the first direction FD. This space is dictated by the cell pouch thickness itself as the channel wraps the cell pouch. The entire second channel 400 is spaced apart from the entire first channel 300 along the second direction SD. The second direction SD is perpendicular to the first direction FD. The first top wall 306 is spaced apart from the first bottom wall 308 along the third direction TD. The third direction is perpendicular to the first direction FD. The third direction TD is perpendicular to the second direction SD.

The first anode tab 114 is spaced apart from the first cathode tab 112 along the second direction SD. The second anode tab 214 is spaced apart from the second cathode tab 214 along the second direction SD. The first inner sidewall 304 is spaced apart from the first outer sidewall 302 along the first direction FD. The first inner tab 312 is spaced apart from the first outer tab 310 along the second direction.

The second channel 400 includes a second outer sidewall 402, a second inner sidewall 404, a second top wall 406 directly interconnecting the second outer sidewall 402 and the second inner sidewall 404, and a second bottom wall 408 directly interconnecting the second outer sidewall 402 and the second inner sidewall 404. The second top wall 406 is perpendicular to the second outer sidewall 402. The second top wall 408 is perpendicular to the second inner sidewall 404. The second bottom wall 408 is perpendicular to the second outer sidewall 402. The second bottom wall 408 is perpendicular to the second inner sidewall 404.

The second channel 400 further includes a second outer tab 410 and a second inner tab 412. The second inner tab 412 protrudes directly from the second inner sidewall 404. The second outer tab 410 protrudes directly from the second outer sidewall 402. The second inner tab 412 is parallel to the first outer tab 412. For the 4P configuration, the second outer tab 410 is directly connected to the first anode tab 114 of the first lithium-ion battery cell 100 to electrically connect the first anode tab 114 of the first lithium-ion battery cell 100 to the second channel 400. The second inner tab 412 is directly connected to the second anode tab 214 of the second lithium-ion battery cell 200 to electrically connect the second anode tab 214 of the second lithium-ion battery cell 200 to the second channel 400. For the 2P layout, the tab 410 connects to anode 114, while tab 412 connects to cathode 212. The second outer sidewall 402 of the second channel 400 is closer to the first outer-containment surface 106 of the first lithium-ion battery cell 100 than to the second outer-containment surface 206 of the second lithium-ion battery cell 200 to facilitate heat transfer from the first lithium-ion battery cell 100 to the second channel 400.

The first outer sidewall 302 is in contact with the first outer-containment surface 106 for the purpose of heat transfer. The first inner sidewall 304 is in contact with the second outer-containment surface 206 for the purpose of heat transfer. The second inner sidewall 404 is in contact with the second outer-containment surface 206 for the purpose of heat transfer. The second outer sidewall 402 is in contact with first outer-containment surface 106. Both the first outer sidewall 302 and the second outer sidewall 402 contact the same cell face for the purpose of heat transfer. Both the first inner sidewall 304 and the second inner sidewall 404 contact the same cell face for the purpose of heat transfer.

With reference to FIGS. 5, 6, 8 and 9, the first top wall 306, the first bottom wall 308, the first outer sidewall 302, and the first inner sidewall 304 collectively define a first channel body 301 of the first channel 300. The first channel body 301 denotes the areas where insulation is applied and therefore does not include the first outer tab 310 and a first inner tab 312 of the first channel 300. Similarly, the second top wall 406, the second bottom wall 408, the second outer sidewall 402, and the second inner sidewall 404 collectively define a second channel body 401 of the second channel 400. The second channel body 401 does not include the second outer tab 410 and the second inner tab 412 of the second channel 400. The first channel 300 further includes a first electrical-insulation film 314 coupled to the first channel body 301. The first electrical-insulation film 314 may be laminated to the first outer-channel surface 316 of the first channel 300. For example, as shown in FIG. 9, the first electrical-insulation film 314 may cover the entire the first outer-channel surface 316 of the first channel body 301. Similarly, the second channel 400 further includes a second electrical-insulation film 414 coupled to the second channel body 401. The second electrical-insulation film 414 may be laminated to the second outer-channel surface 416 of the first channel 400. For example, as shown in FIG. 9, the second electrical-insulation film 414 may cover the entire the second outer-channel surface 416 of the second channel body 401. The first electrical-insulation film 314 is not disposed on the first outer tab 310 and the first inner tab 312 of the first channel 300 to allow the welding between the first outer tab 310 and the first inner tab 312 and the first cathode tab 112 and the second cathode tab 212, respectively. Similarly, the second electrical-insulation film 414 is not disposed on the second outer tab 410 and the second inner tab 412 of the second channel 400 to allow the welding between the second outer tab 410 and the second inner tab 412 and the first anode tab 114 and the second anode tab 214, respectively.

Alternatively, as shown in FIGS. 10 and 11, the first electrical-insulation film 314 may be disposed on the first inner-channel surface 318 of the first channel body 301. For example, the first electrical-insulation film 314 may cover the entire the first inner-channel surface 318 of the first channel body 301. The second electrical-insulation film 414 may be laminated to the second inner-channel surface 418 of the first channel body 401. For example, the second electrical-insulation film 414 may cover the entire the second inner-channel surface 418 of the second channel body 401.

Figure 12:
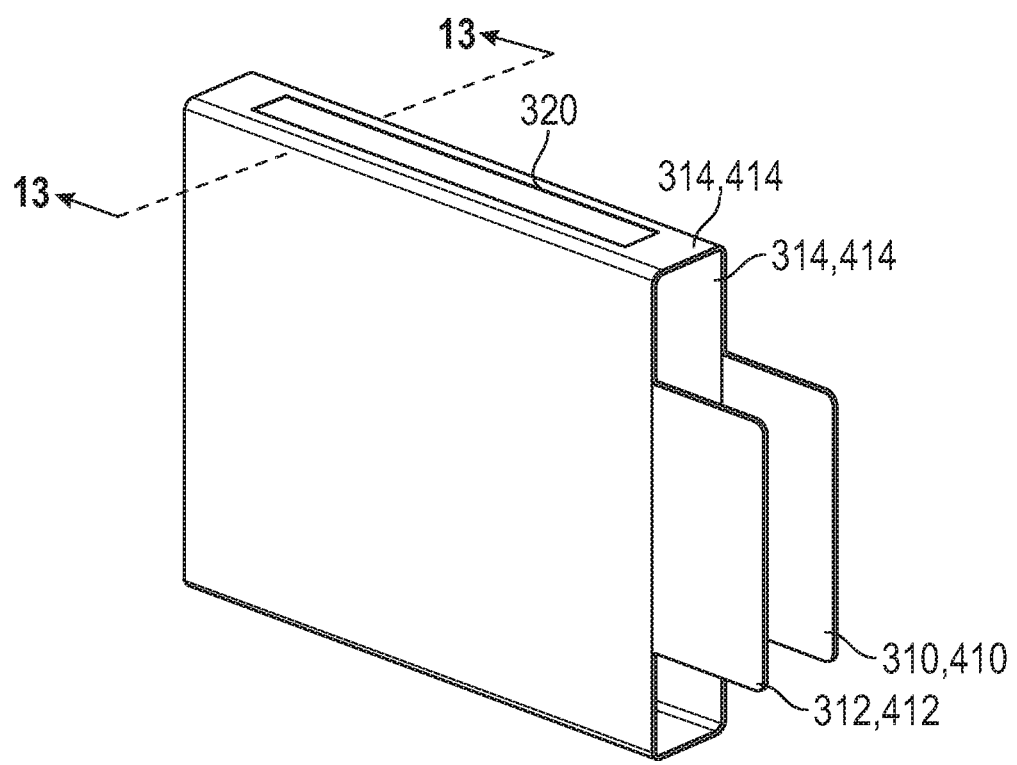
FIG. 12 is a schematic perspective view of either the first channel or the second channel, including an electrical-insulation film disposed on the outer and inner surfaces thereof.
Figure 13:
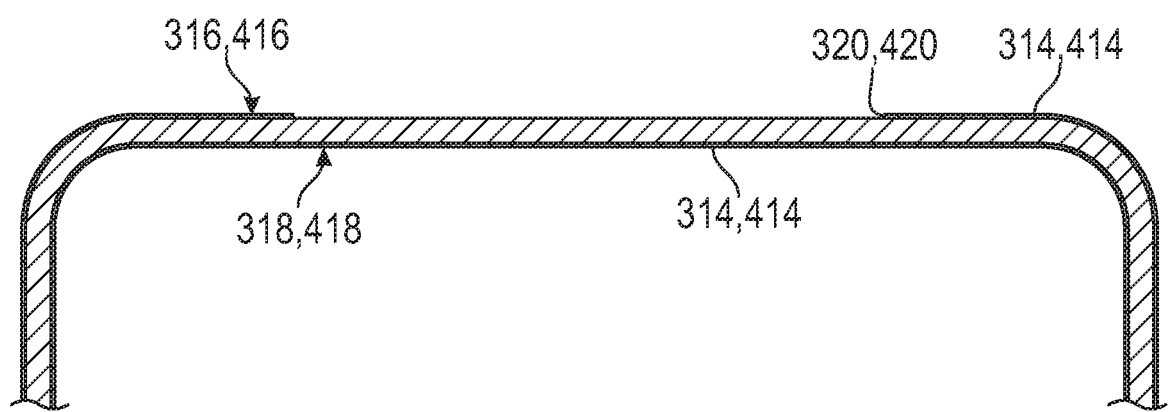
FIG. 13 is a schematic cross-sectional view of either the first channel or the second channel, taken along section line 13-13 of FIG. 12.

Alternatively, as shown in FIGS. 12 and 13, the first electrical-insulation films 314 may be disposed on the first inner-channel surface 318 and the first outer-channels surface 316 of the first channel body 301. Similar, the second electrical-insulation films 414 may be laminated to the second inner-channel surface 418 and the second outer-channel surface 416 of the first channel body 401. The first electrical-insulation film 314 and/or the second electrical-insulation film 414 may define a film opening 320, 420 for attaching secondary components (e.g., additional busbars, cell voltage sense line connections, etc.). The film openings 320, 420 may be die cut or laser etched in the first electrical-insulation film 314 and/or the second electrical-insulation film 414. The first electrical-insulation film 314 and/or the second electrical-insulation film 414 shown in FIG. 9 may also include the film openings 320, 420.

Figure 14:
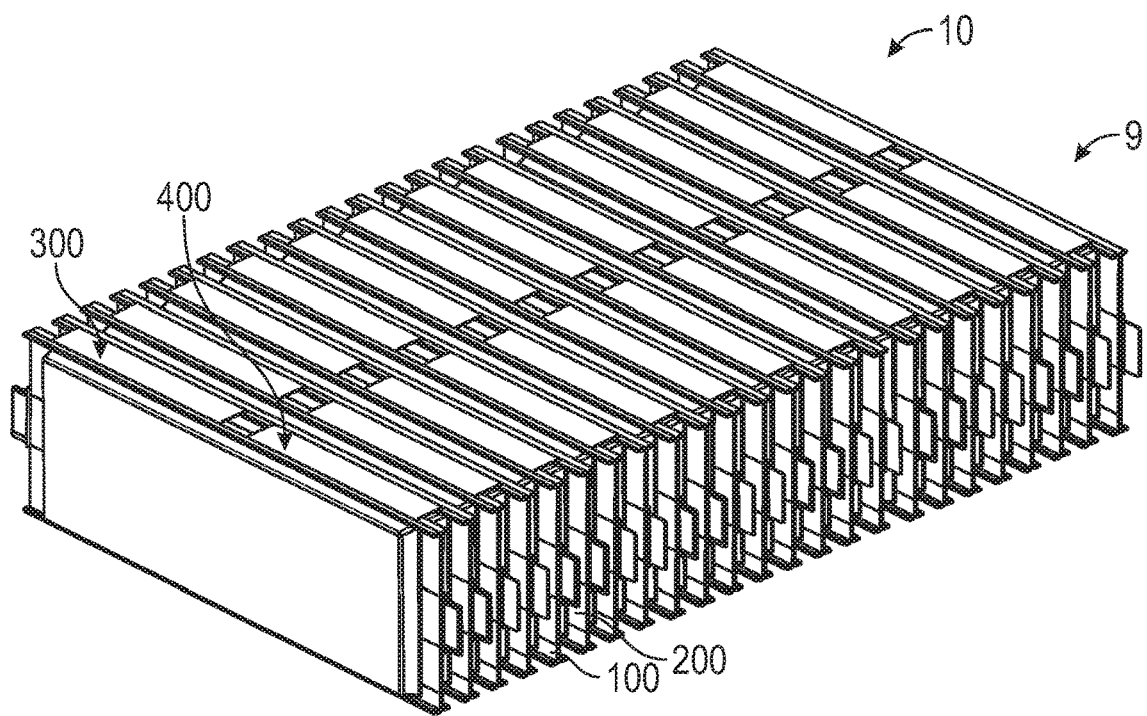
FIG. 14 is a schematic perspective view of a battery module with a 4P layout.
Figure 15:
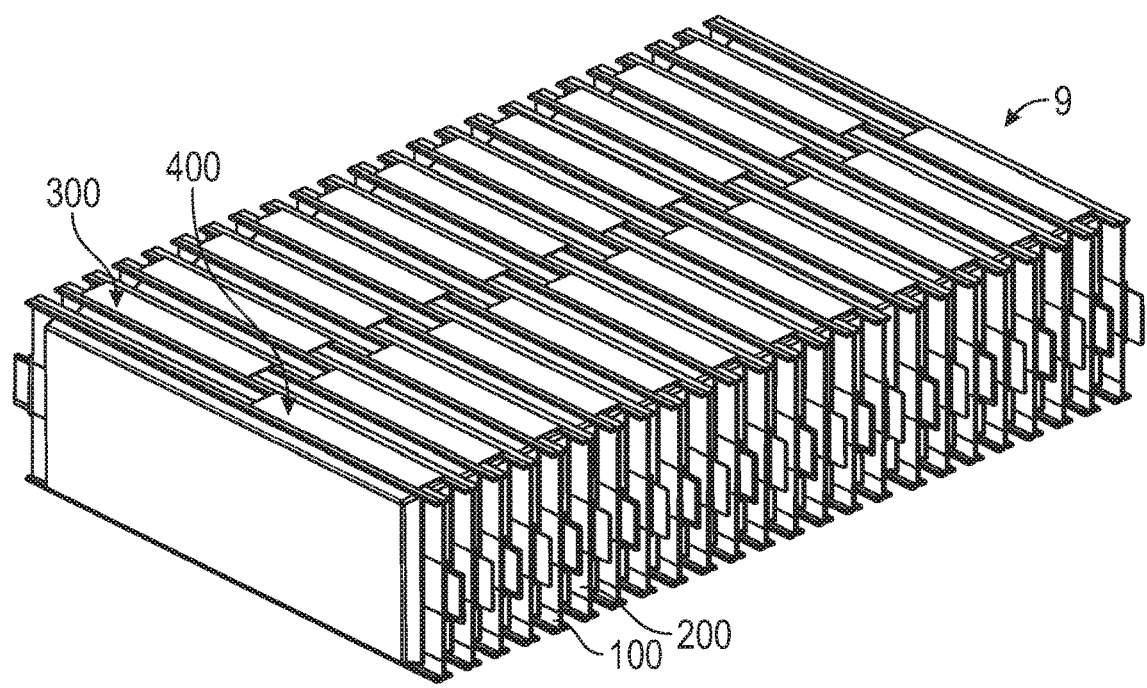
FIG. 15 is a schematic perspective of a battery module with a 2P layout.

With reference to FIGS. 14 and 15, the first channel 300 and the second channel 400 enables a versatile module architecture, allowing for either a 4P layout (FIG. 15) or a 2P layout (FIG. 15). For the 4P layout (FIG. 14), the additional busbars may be included to complete the electrical connections on the 4P system. The 4P layout includes 12 cell groups, which renders a 48V module. For the 2P layout, the channel connects cell groups, thus no further busbars are required. The design enables large surface and cross-sectional areas for thermal interface and minimal current density while still achieving a low-height module.

Figure 16:
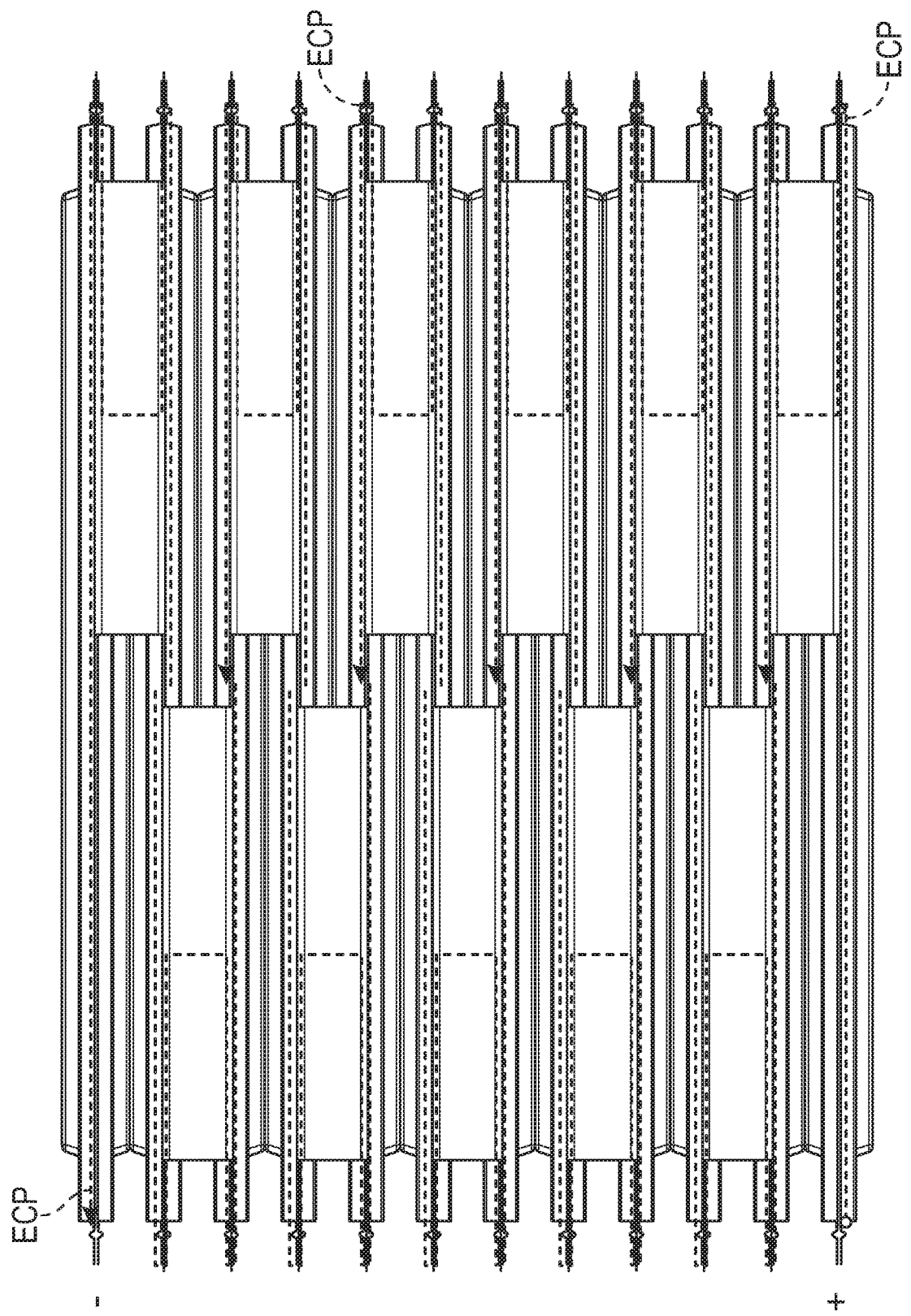
FIG. 16 is a schematic top view of the battery pack shown in FIG. 15 (with a 2P layout), depicting the electrical current path with dashed lines.
Figure 17A:
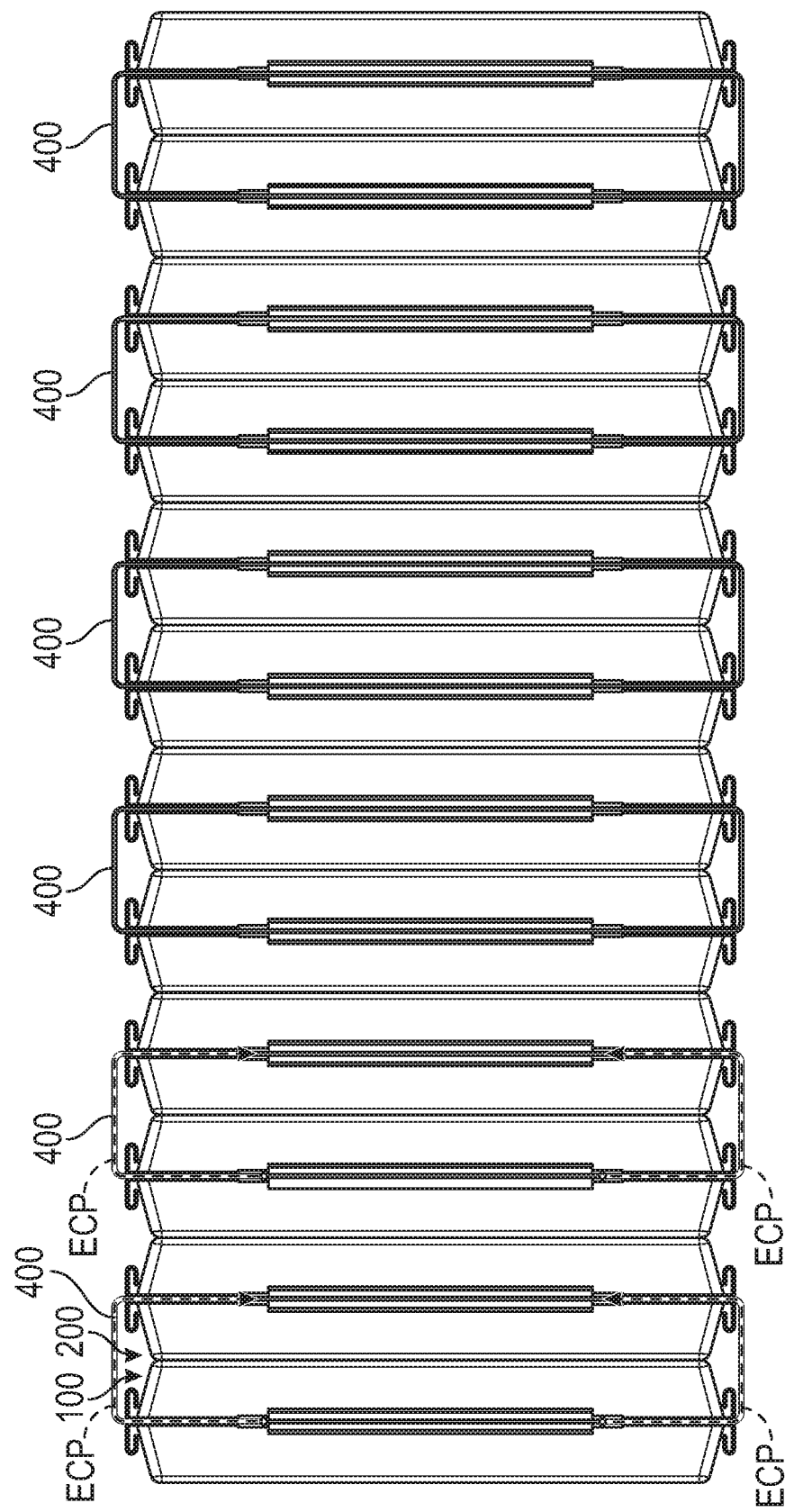
FIG. 17A is a schematic top view of the battery pack shown in FIG. 15 (with a 2P layout), depicting the electrical current path with dashed lines for a 4P configuration.
Figure 17B:
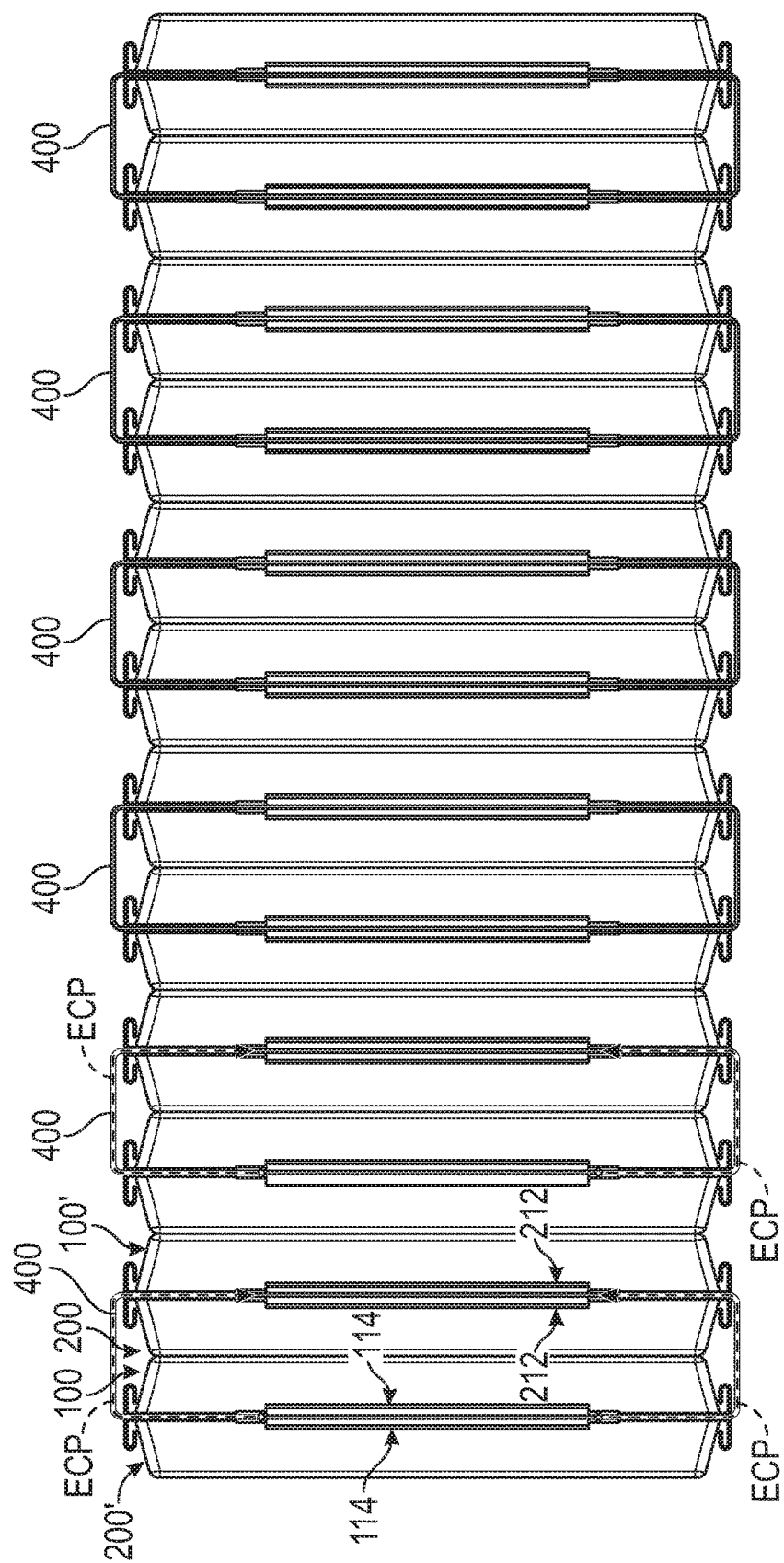
FIG. 17B is a schematic top view of the battery pack shown in FIG. 15 (with a 2P layout), depicting the electrical current path with dashed lines for a 2P configuration

With reference to FIGS. 16 and 17, as discussed above, the first channel 300 and the second channel 400 serves as a first busbar and a second busbar, respectively. FIGS. 16 and 17 schematically illustrates the battery module 9 with 2P layout, and the electrical current path ECP is illustrated with dashed lines. As such, the first channel 300 and the second channel 400 electrically connect the group of battery cells. For the 2P module, the first channel 300 connects the first pair of cells 100 to the second pair of cells 200, such that cathode and anode of neighboring cell groups are connected by the channel. (See FIG. 17B in which 100' is the same as cell 100, just flipped 180 degrees about axis FD. 200' is the same as 200, just flipped 180 degrees about axis FD). Cells 100 and 200 are exactly the same, just flipped about axis TD to present alternating anode and cathode for the 2P configuration.

Figure 18:
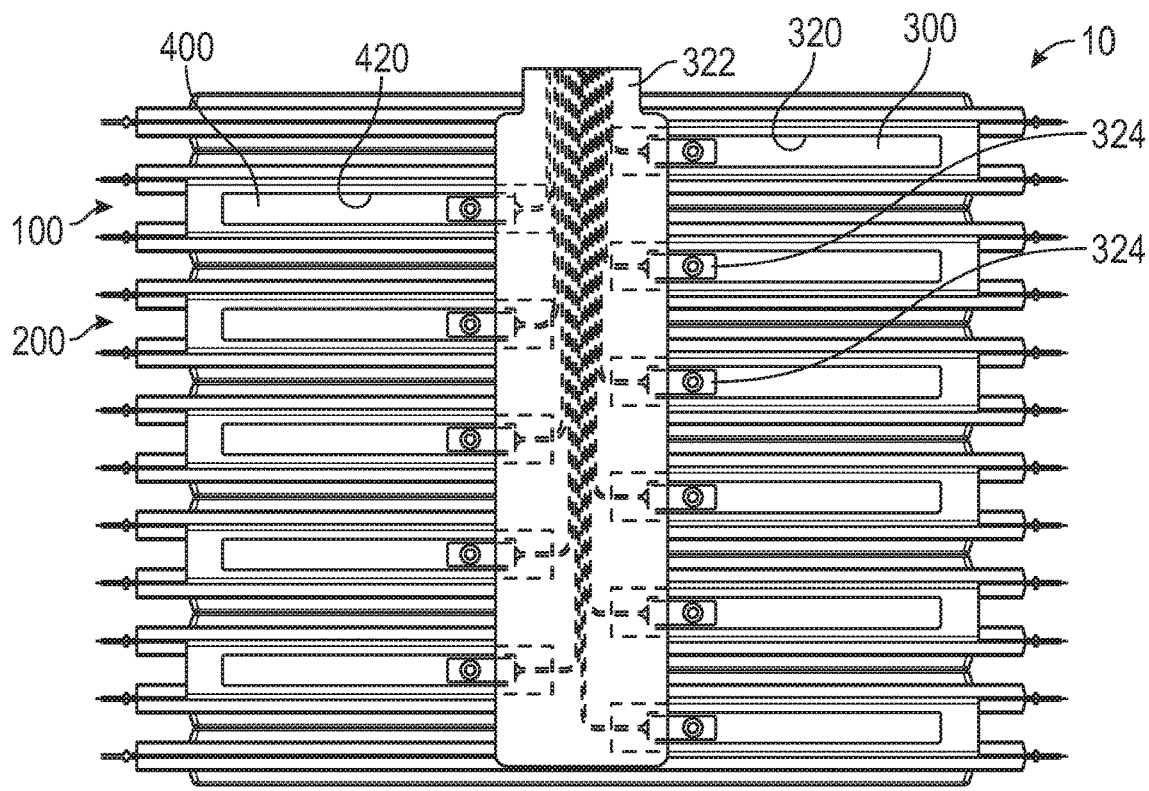
FIG. 18 is a schematic top view of the battery pack shown in FIG. 15, including a flexible circuit for voltage sensing.
Figure 19:
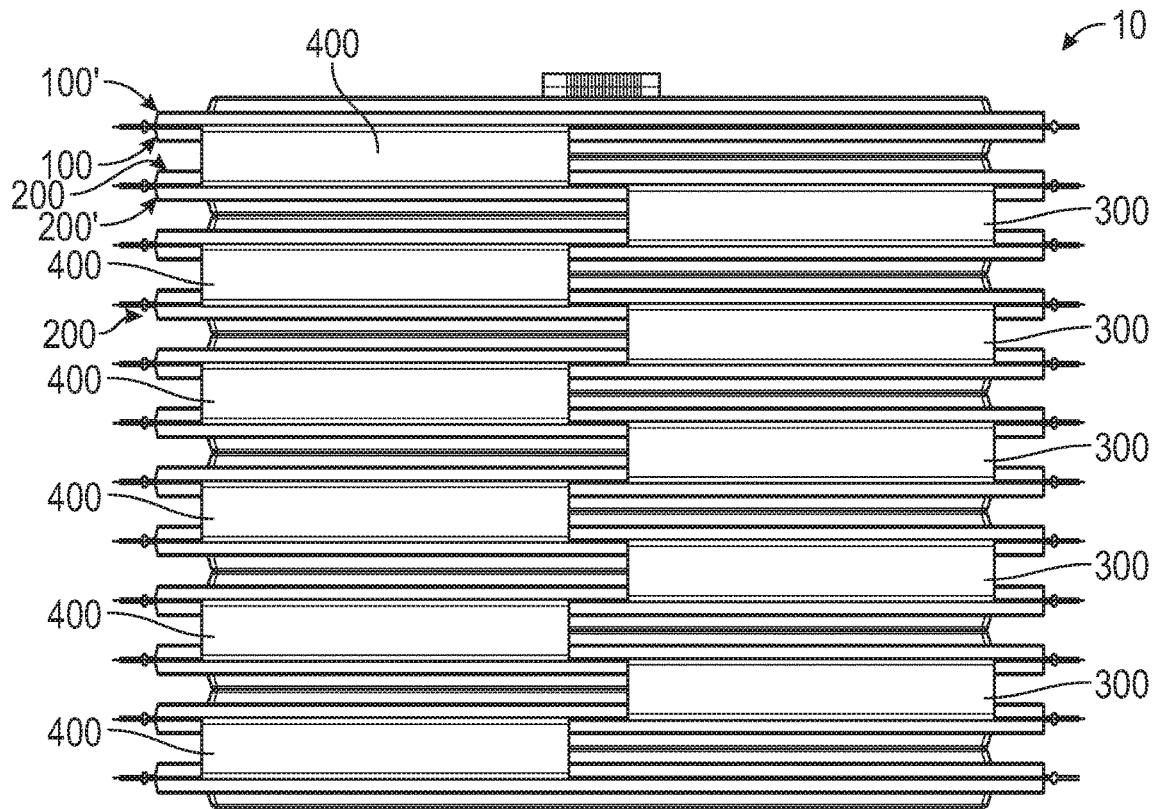
FIG. 19 is a schematic bottom view of the battery module shown in FIG. 15, including a flexible circuit for voltage sensing.

With reference to FIGS. 18 and 19, the battery pack 10 may additionally include a flexible circuit 322 for voltage sensing an interfacing to cell monitoring electronics. Flying leads 324 electrically interconnect the first channel 300 and the second channel 400 with the flexible circuit 322. To this end, the flying leads 324 may be welded to the first channel 300 and the second channel 400.

Figure 20:
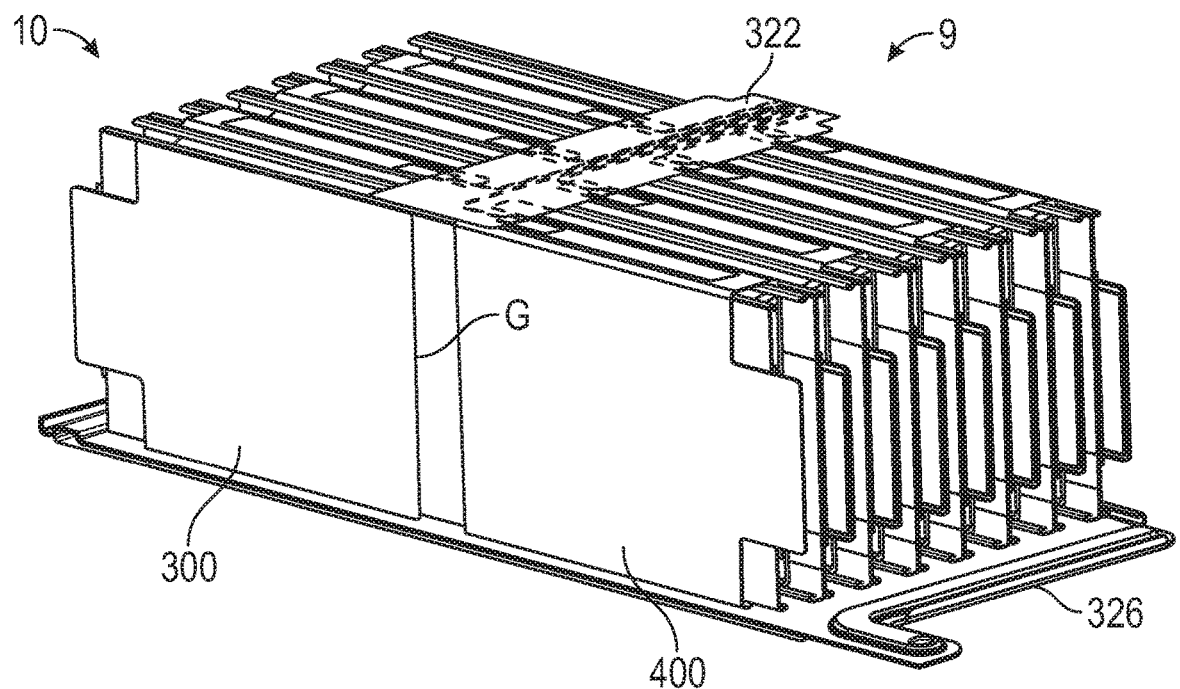
FIG. 20 is a schematic perspective view of the battery module shown in FIG. 15, including a cold plate.

With reference to FIG. 20, the battery pack 10 is part of a battery module 9 and may include a cold plate 326 at the bottom thereof to cool the battery pack 10. Another cold plate 326 may be placed at the top of the battery pack 10. Adjacent busbars (i.e., the first channel 300 and the second channel 400) are at different potentials (i.e., a difference of one cell's voltage). The first channel 300 and the second channel 400 do not contact each other to prevent a short circuit. In one embodiment, both the inner and outer faces of the first channel 300 and the second channel 400 are electrically insulated. Since the battery module 9 is under sufficient compression, the adjacent busbars (i.e., the first channel 300 and the second channel 400) would not move the distance (d) by which the busbars are separated. Therefore, the gap G between the first channel 300 and the second channel 400 has the distance (d). As a non-limiting example, the distance (d) is about 20 mm, which is more than sufficient for creepage and clearance at the working voltage of the module 9, or even of the battery pack 10.

Figure 21:
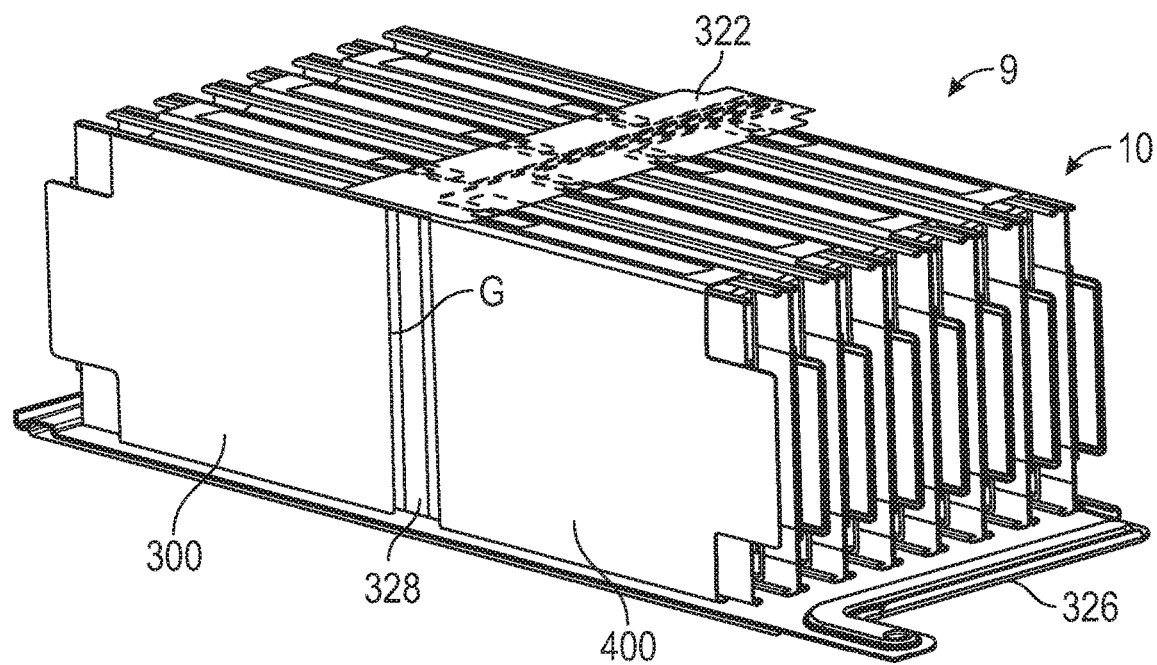
FIG. 21 is a schematic perspective view of the battery module shown in FIG. 15, including an adhesive between the first and second channels.

With reference to FIG. 21, instead of insulating both inner and outer faces of the first channel 300 and the second channel 400, an adhesive 328 may be applied on a face of the cell (e.g., the first lithium-ion battery cell 100 and the second lithium-ion battery cell 200). The adhesive 328 may be an adhesive film, dispensed liquid adhesive, foam, plastic, etc. The adhesive film or dispensed adhesive 328 only needs to be applied to the cell face locally within the gap G. Thickness and/or wetting properties of the adhesive 328 should be selected such that under compression of the module, there is essentially a seal between the first channel 300 and the second channel 400. The adhesive 328 can double as a manufacturing aid as well to help adhere mini-stacks of cells before building the entire module. It may be desired to use this adhesive strip 328 even in the embodiment shown in FIG. 20, where the channels contain the insulating film. A simple foam piece or even a compliant plastic piece of correct thickness placed between the adjoining first channel 300 and the second channel 400 within the gap G. This foam or plastic piece is an alternative to an adhesive should there be concern over the electrical isolation. If the outer surface of the first channel 300 and the second channel 400 are not electrically insulated, then an appropriate electrical-insulation layer should be applied to the metal cold plate 326 to prevent loss of isolation to the cold plate 326. Examples for this electrical-insulation layer are compliant thermal interface materials (TIM) or polyethylene naphthalate (PEN) or polyethylene terephthalate (PET) films laminated to the cold plate 326.

Figure 22:
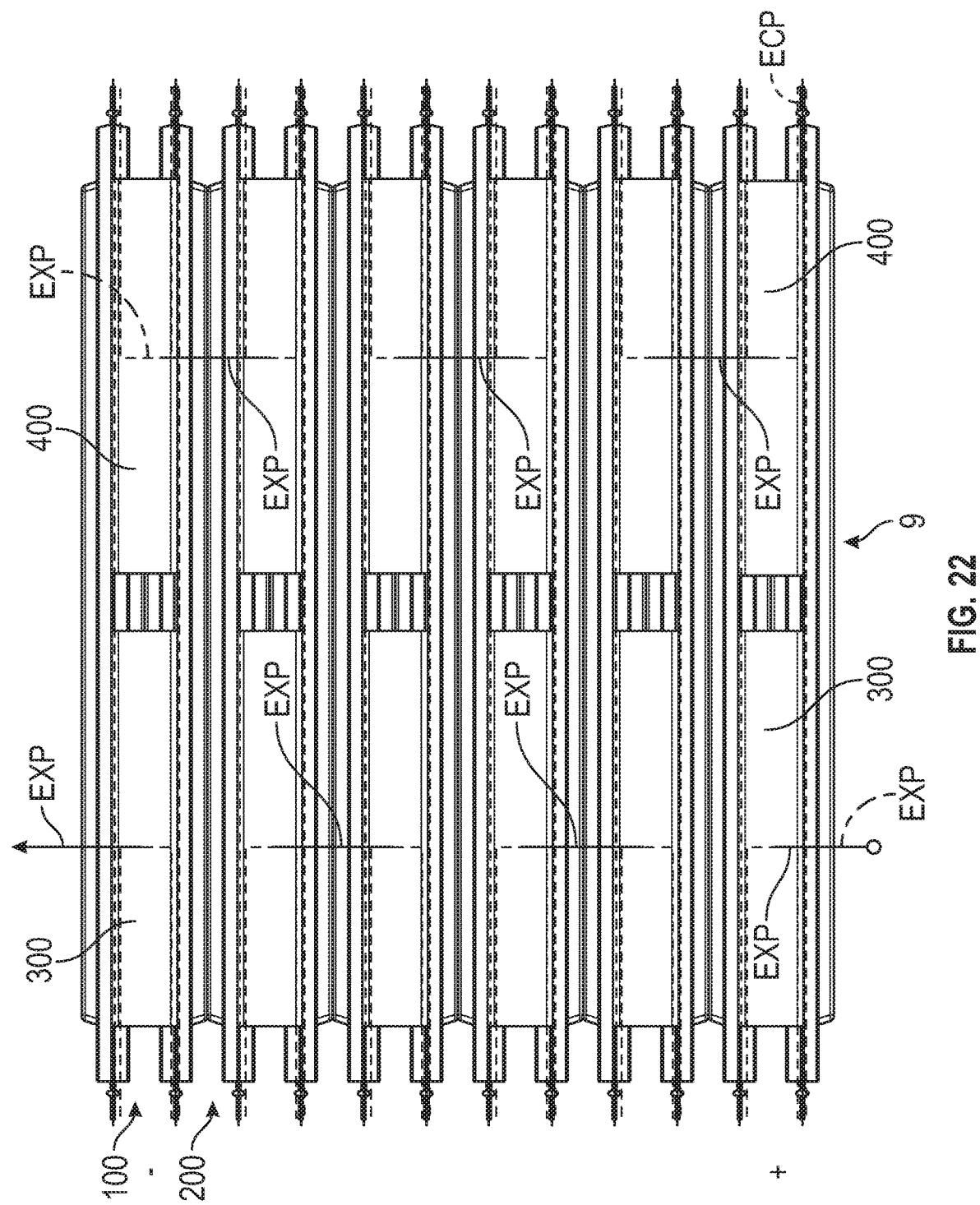
FIG. 22 is a schematic top view of the battery module shown in FIG. 14.
Figure 23A:
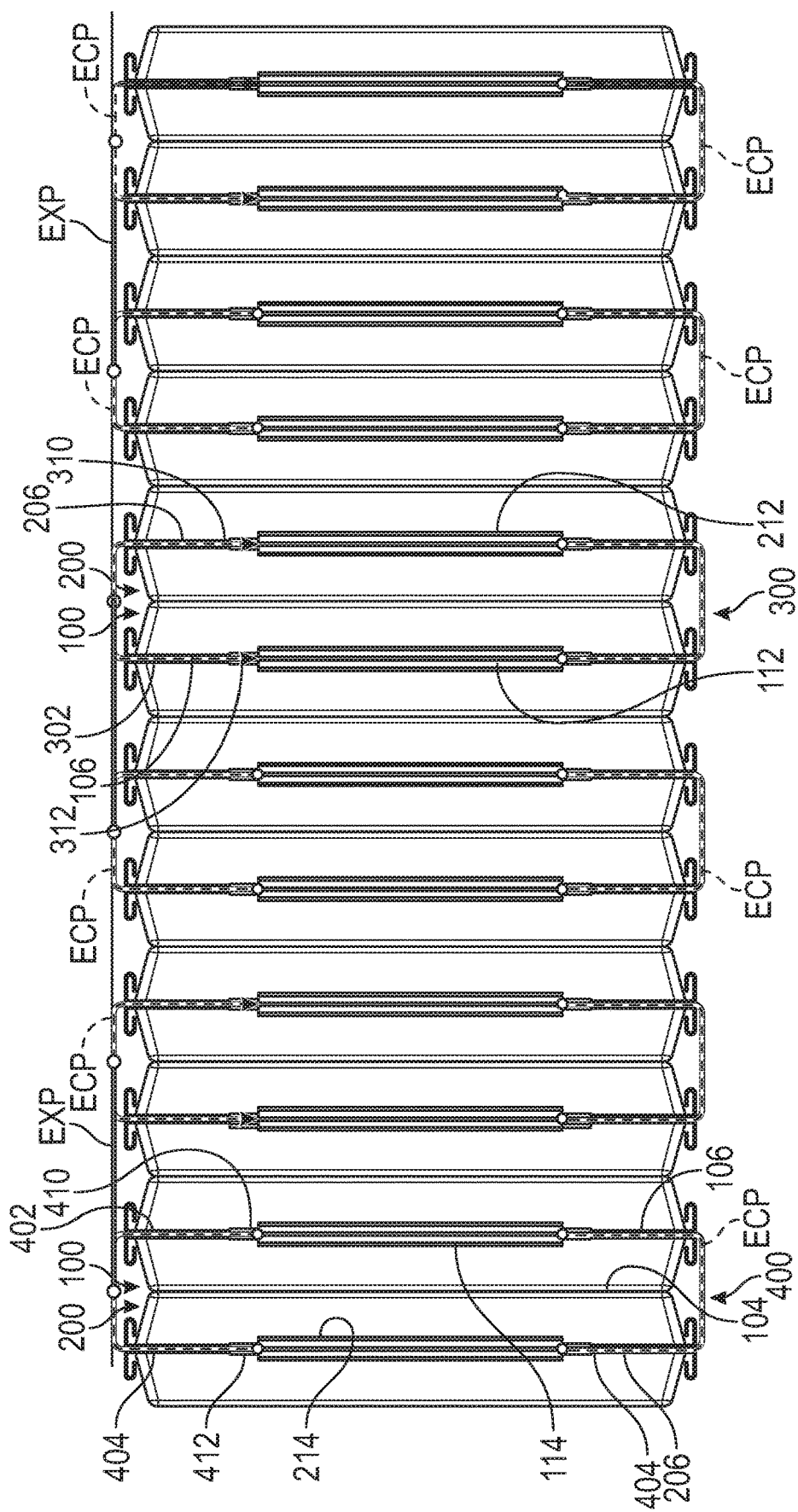
FIG. 23A is a schematic side view of the battery module shown in FIG. 14 for a 4P configuration.
Figure 23B:
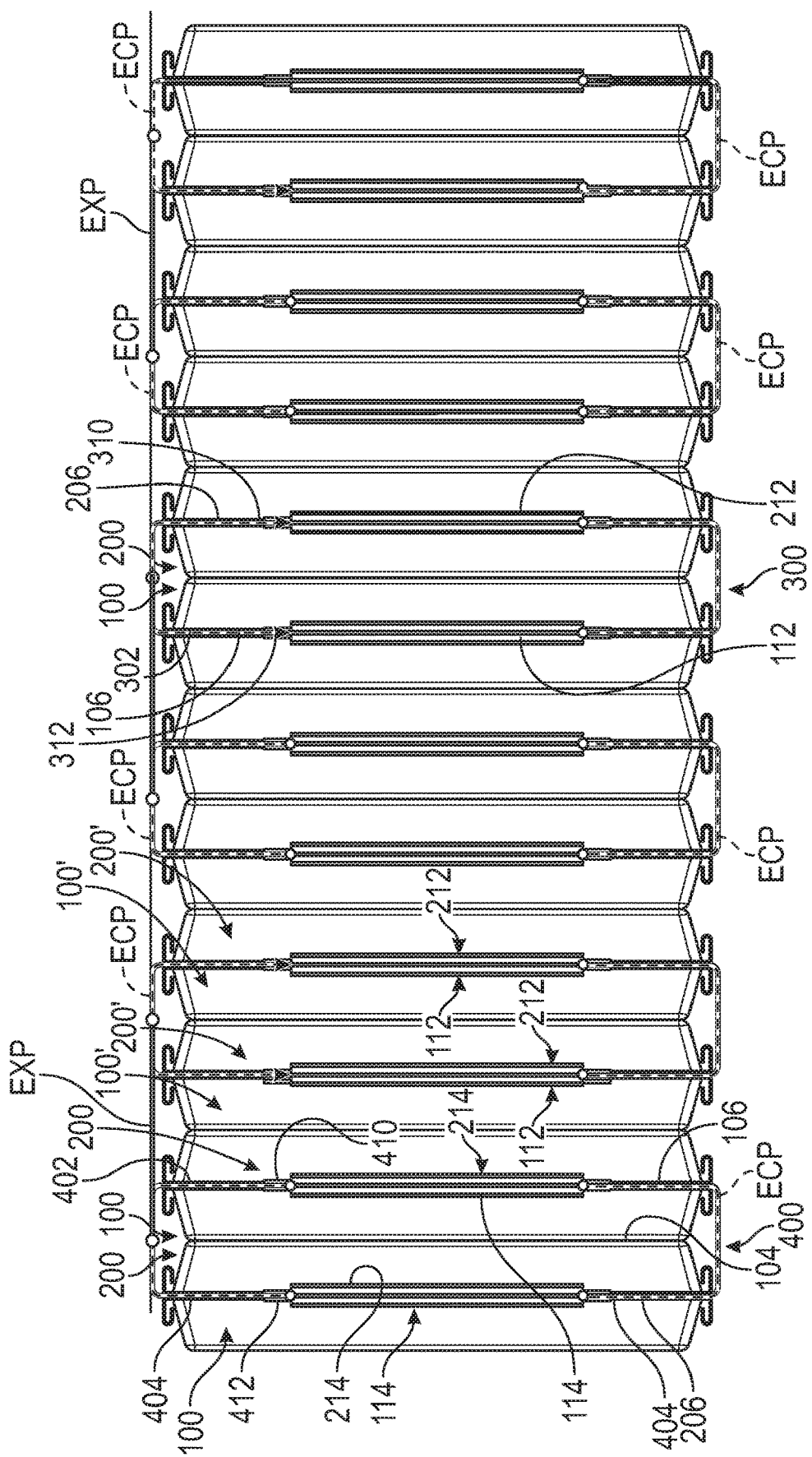
FIG. 23B is a schematic side view of the battery module shown in FIG. 14 for a 2P configuration.

With reference to FIGS. 14, 22, and 23, the first channel 300 and the second channel 400 serves as a first busbar and a second busbar, respectively. FIGS. 22 and 23 schematically illustrates the battery module 9 with 4P layout, and the electrical current path ECP is illustrated with dashed lines. As such, the first channel 300 and the second channel 400 electrically connect the group of battery cells (See FIG. 23B for a description of this following the 2P example in FIG. 17B) (e.g., the first lithium-ion battery cell 100 and the second lithium-ion battery cell 200) to one another. The solid lines EXP represent external busbar components for connecting neighboring cells groups or for having module terminations. These can be integral to the voltage sensing circuit sitting atop the module. A cold plate 326 may also be added.

Figure 24:
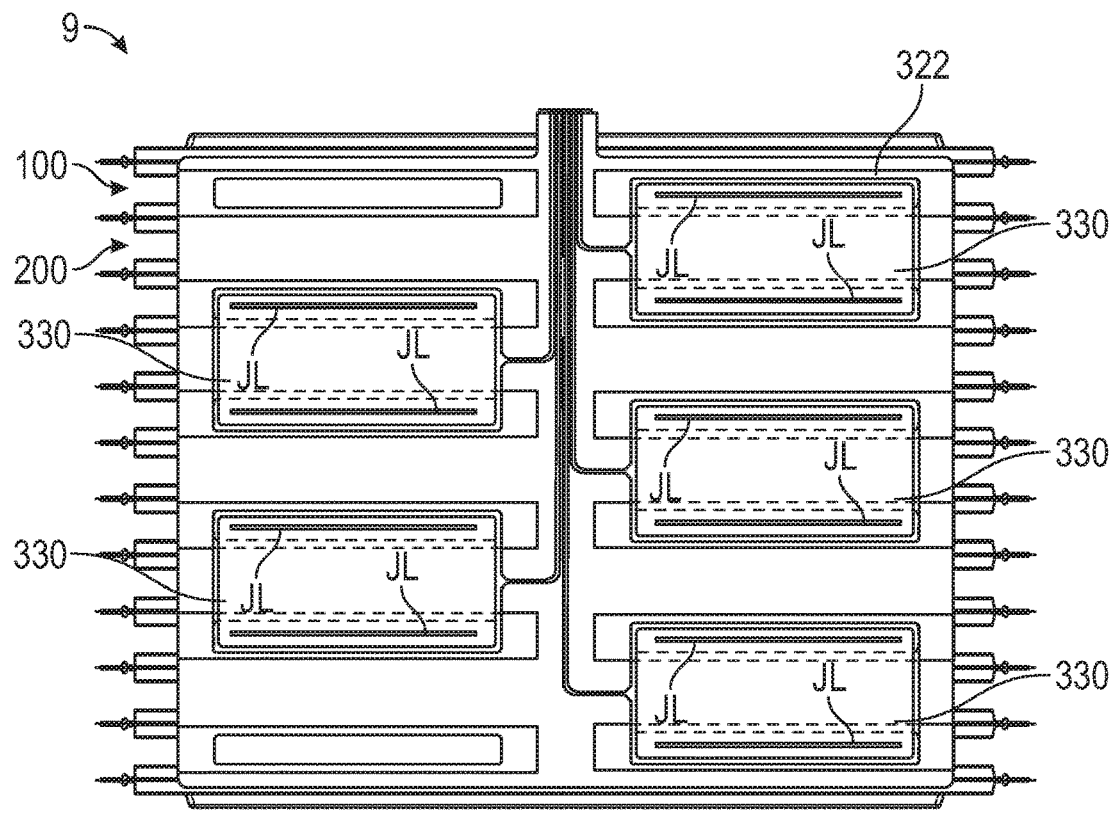
FIG. 24 is a schematic top view of the battery module shown in FIG. 14, including a flexible circuit for voltage sensing and bussing.
Figure 25:
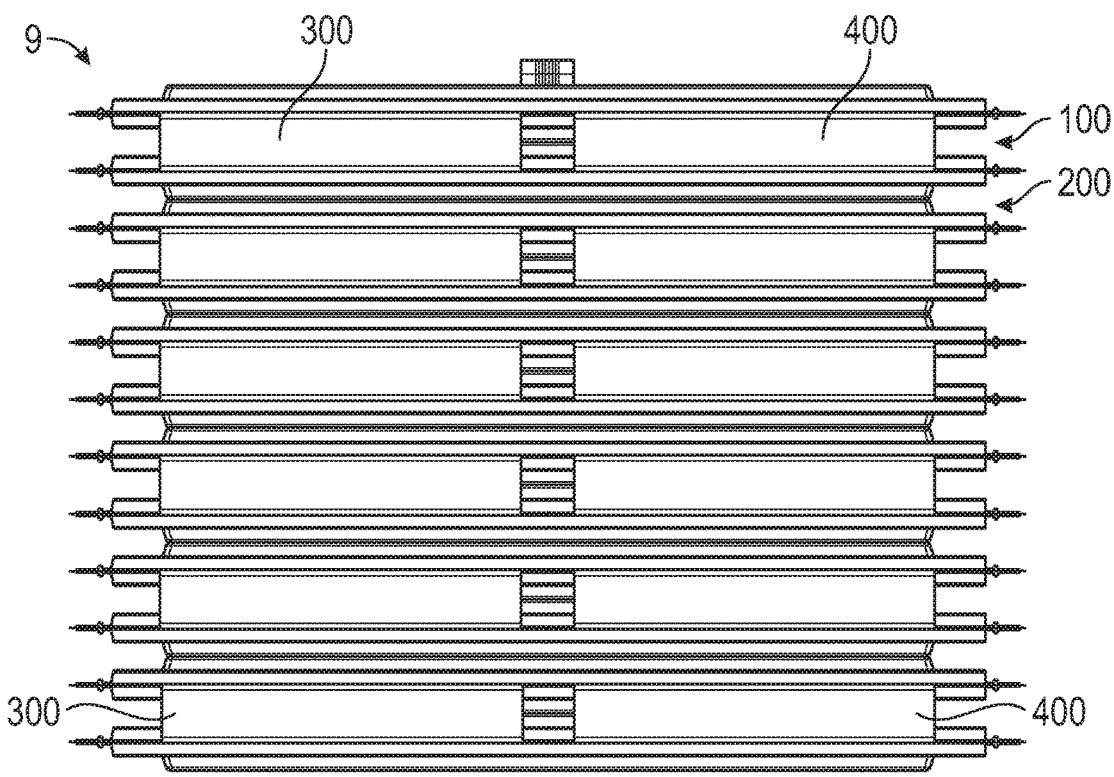
FIG. 25 is a schematic bottom view of the battery module shown in FIG. 14, including a flexible circuit for voltage sensing.

With reference to FIGS. 24 and 25, in the 4P layout, the battery module 9 may also include a flexible circuit 322 for voltage sensing an interfacing to cell monitoring electronics. Bussing interconnects 330 electrically interconnect neighboring cell groups. To this end, the bussing interconnects 330 are joined to the first channels 300 and the second channels 400 as represented by joining/weld lines JL. The bussing interconnects are integral to the flexible circuit and negates the need to have separate flying leads.

Figure 26:
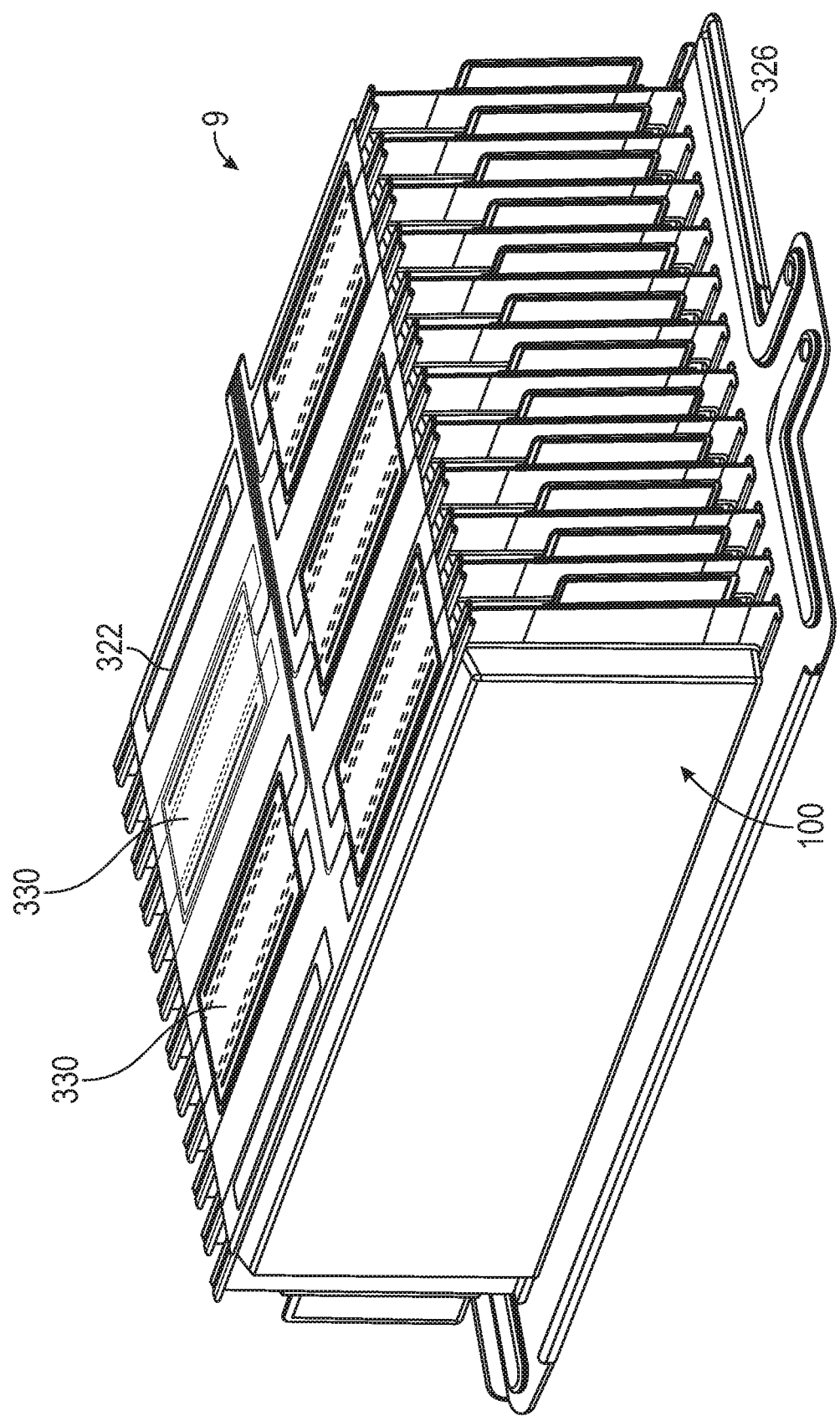
FIG. 26 is a schematic perspective view of the battery module shown in FIG. 14, including a cold plate.

With reference to FIG. 26, in the 4P layout, the battery module 9 may include the cold plate 326 at the bottom thereof to cool the battery module 9. Another cold plate 326 may be placed at the top of the battery pack 10.

Figure 27:
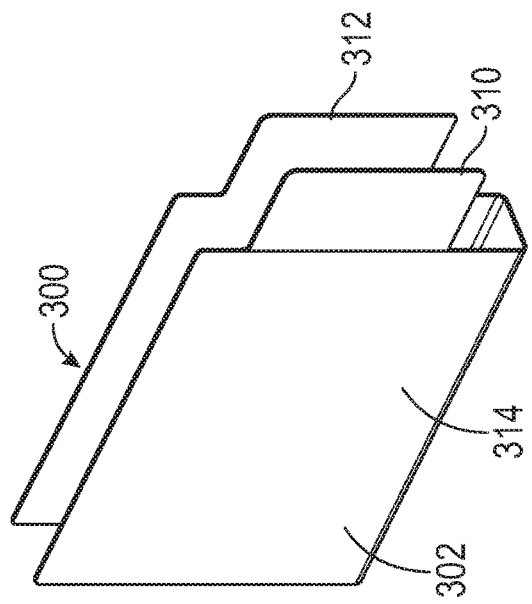
FIG. 27 is a schematic perspective bottom view of an ultra-low profile channel without a bottom wall.
Figure 28:
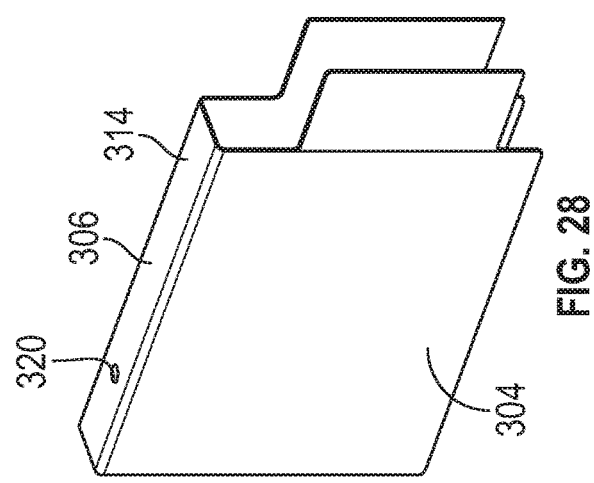
FIG. 28 is a schematic perspective top view of an ultra-low profile channel without a bottom wall.

FIGS. 27 and 28, either the first channel 300 or the second channel 400 may be configured as a sleeve instead of an enclosed case. In the depicted embodiment, the first channel 300 is substantially similar (if not identical) to the first channel 300 discloses above, except that it does not include the first bottom wall 308. The second channel 400 may also be configured as a sleeve and lack the second bottom wall 408. The first electrical-insulation film 314 may define the film opening 320 to expose the first top wall 306. The film opening 320 allows the first channel 300 to be electrically connected to other components.

Figure 29:
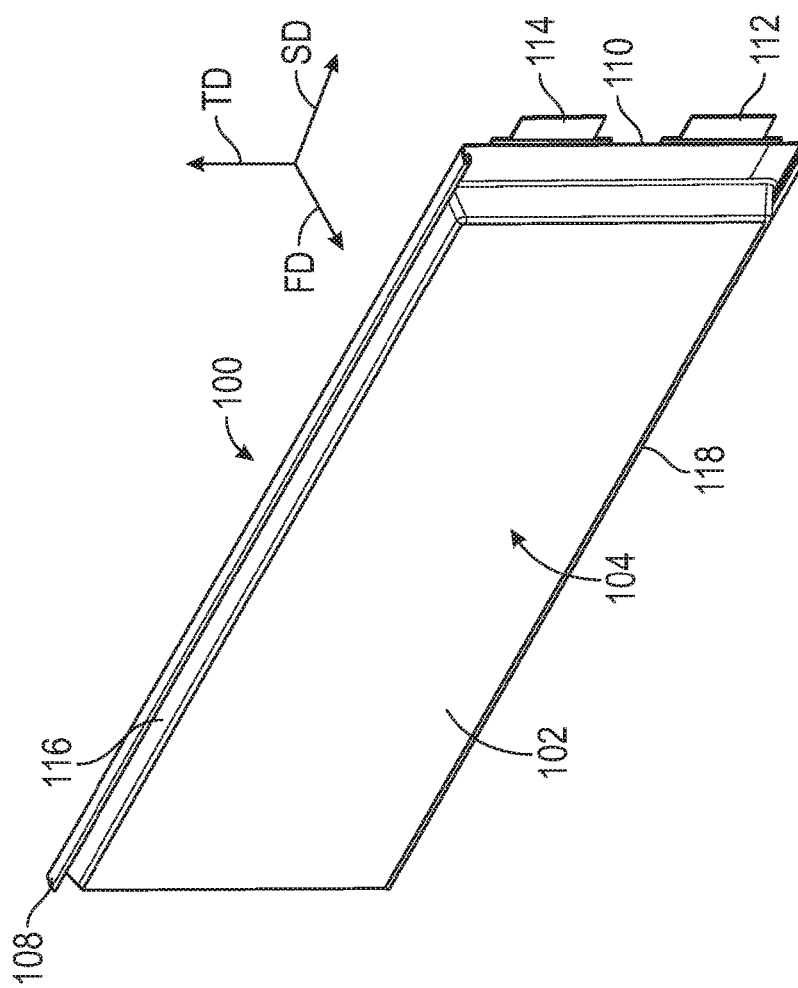
FIG. 29 is a schematic perspective view of a lithium-ion battery cell with the anode tab and the cathode tab protruding from the same side of the containment.

With reference to FIG. 29, in this embodiment, the first cathode tab 112 and the first anode tab 114 protrude from the same side of the first containment 102, and the battery cell 100 is referred to as a P-type cell. Thus, the first cathode tab 112 and the first anode tab 114 are both closer to the first front edge 110 than to the first rear edge 108. The first cathode tab 112 is spaced apart from the first anode tab 114 along the third direction TD.

Figure 30:
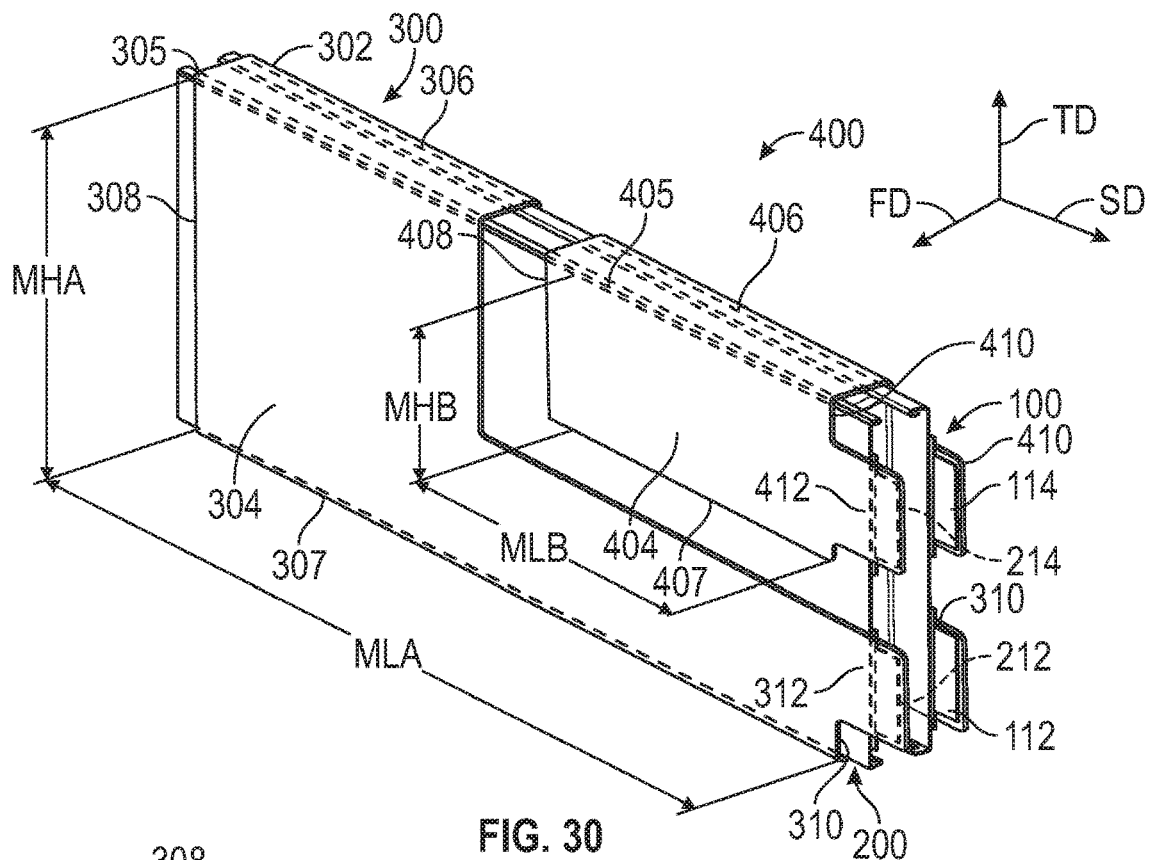
FIG. 30 is a schematic perspective top view of the first lithium-ion battery cell, the second lithium-ion battery cell, the first channel, and the second channel assembled together.
Figure 31:
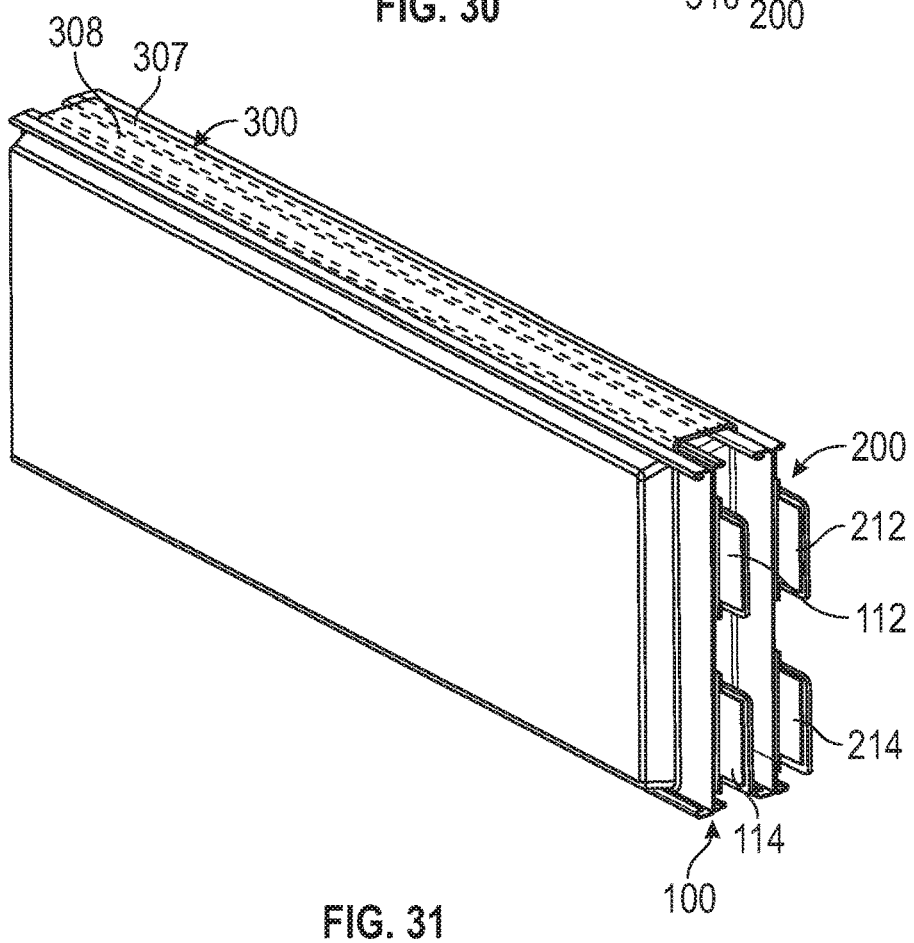
FIG. 31 is a schematic perspective bottom view of the first lithium-ion battery cell, the second lithium-ion battery cell, the first channel, and the second channel assembled together.

With reference to FIGS. 30 and 31, once the first lithium-ion battery cell 100, the second lithium-ion battery cell 200, the first channel 300, and the second channel 400 are assembled together, the second cathode tab 212 is spaced apart from the second anode tab 214 along the third direction TD. The first cathode tab 112 is spaced apart from the second cathode tab 212 along the first direction FD, and the first anode tab 114 is spaced apart from the second anode tab 214 along the first direction FD. In the depicted embodiment, the first inner sidewall 304 defines a first upper end 305 and a first lower end 307 opposite the first upper end 305. The first upper end 305 of the first inner sidewall 304 is directly coupled to the first top wall 306, and the first lower end 307 is directly coupled to the first bottom wall 308. The first channel has a first maximum height MHA defined from the first upper end 305 to the first lower end 307 of the first inner sidewall 304 along the third direction TD. The second inner sidewall 404 defines a second upper end 405 and a second lower end 407 opposite the first upper end 405. The second upper end 405 of the second inner sidewall 404 is directly coupled to the second top wall 406. The second channel 400 defines a second maximum height MHB defined from the second upper end 405 of the second inner sidewall 404 to the second lower end 407 of the second inner sidewall 404 along the third direction TD. The first maximum height MHA is greater than the second maximum height MHB. The first inner sidewall 304 has a first rear end 308 and a first front end 210 opposite the first rear end 308. The first front end 308 is spaced apart from the first rear end 310 along the second direction SD. The first channel 300 defines a first maximum length MLA defined from the first rear end 308 of the first inner sidewall 304 to the first front end 310 of the first inner sidewall 304 along the second direction SD. The second inner sidewall 404 has a second rear end 408 and a second front end 410 opposite the second rear end 408. The second front end 410 is spaced apart from the second rear end 408 along the second direction SD. The second channel 400 has a second maximum length MLB defined from the second rear end 408 of the second inner sidewall 404 to the second rear end 410 of the second inner sidewall 404 along the second direction SD. The first maximum length MLA is greater than the second maximum length MLB. The second rear end 408 of the second inner sidewall 404 is spaced apart from the first rear end 308 of the first inner sidewall 404 along the second direction SD. The second front end 410 of the second inner sidewall 404 is spaced apart from the first front end 310 of the first inner sidewall 304 along the third direction TD. The second front end 410 of the second inner sidewall 404 is not spaced apart from the first front end 310 of the first inner sidewall 304 along the second direction SD. The first inner tab 312 protrudes directly from the first inner sidewall 404. The first outer tab 310 protrudes directly from the first outer sidewall 302. The first inner tab 312 is parallel to the first outer tab 310. The first outer tab 310 is directly connected (e.g., welded) to the first cathode tab 112 of the first lithium-ion battery cell 100 to electrically connect the first cathode tab 112 of the first lithium-ion battery cell 100 to the first channel 300. The first inner tab 312 is directly connected to the second cathode tab 212 of the second lithium-ion battery cell 200 to electrically connect the second cathode tab 212 of the second lithium-ion battery cell 200 to the first channel 300. Just like the N-type cell module assembly, the welds can take place and typically are completed after the assembly is stacked together (not an individual cell group level). The second outer tab 410 protrudes directly from the second outer sidewall 302. The second inner tab 412 is parallel to the first outer tab 310. The second outer tab 410 is directly connected to the first anode tab 114 of the first lithium-ion battery cell 100 to electrically connect the first anode tab 114 of the first lithium-ion battery cell 100 to the second channel 400. The second inner tab 312 is directly connected to the second anode tab 214 of the second lithium-ion battery cell 200 to electrically connect the second anode tab 214 of the second lithium-ion battery cell 200 to the second channel 400. The first outer tab 310 is spaced apart from the first inner tab 312 along the first direction FD. The second outer tab 410 is spaced apart from the second inner tab 412 along the second direction FD. The second outer tab 410 is spaced apart from the first outer tab 310 along the third direction TD. The second inner tab 412 is spaced apart from the first inner tab 312 along the third direction TD. The second lower end 407 of the second inner sidewall 404 is spaced apart from the first lower end 307 of the first inner sidewall 304 along the third direction TD. In this embodiment, the battery module 9 may have a 2P layout or a 4P layout as discussed above. Unlike the N-type cell, for the P-type cell (regardless of the 2P and 4P layout), two unique cell part numbers are needed in order to correctly connect electrically with the asymmetric cell tabs. For the 2P, channel 300 would connect cathodes 112 to anodes 214, and channel 400 would connect cathodes 212 to anodes 114 of the following cell group. Just like the N-type assembly, for the P-type cell, the channel 300 and 400 need to be staggered or alternated in the stack to electrically connect cathode and anode properly for neighboring pairs of cells.

The present disclosure also describes method. The method includes: comprising: (a) placing a first channel around a first lithium-ion battery cell and a second lithium-ion battery cell; and (b) placing a second channel around the first lithium-ion battery cell and the second lithium-ion battery cell. The first channel serves as a first heat sink to allow heat transfer from both the first lithium-ion battery cell and the second lithium-ion battery cell to the first channel. The second channel serves as a second heat sink to allow heat transfer from both the first lithium-ion battery cell and the second lithium-ion battery cell to the second channel.

While the best modes for carrying out the disclosure have been described in detail, those familiar with the art to which this disclosure relates will recognize various alternative designs and embodiments for practicing the disclosure within the scope of the appended claims.

What is claimed is:
1. A prismatic battery stack, comprising:
 a first lithium-ion battery cell, wherein the first lithium-ion battery cell includes:
  a first containment defining a first inner-containment surface and a first outer-containment surface opposite the first inner-containment surface;
  a first cathode tab protruding out from the first containment;

a first anode tab protruding out from the first containment;

a second lithium-ion battery cell electrically connected to the first lithium-ion battery cell, wherein the second lithium-ion battery cell includes:

a second containment defining a second inner-containment surface and a second outer-containment surface opposite the second inner-containment surface;

a second cathode tab protruding out from the second containment;

a second anode tab protruding out from the second containment;

a first channel disposed around the first lithium-ion battery cell and the second lithium-ion battery cell;

a second channel disposed around the first lithium-ion battery cell and the second lithium-ion battery cell;

wherein the first channel serves as a first heat sink to allow heat transfer from both the first lithium-ion battery cell and the second lithium-ion battery cell to the first channel;

wherein the second channel serves as a second heat sink to allow heat transfer from both the first lithium-ion battery cell and the second lithium-ion battery cell to the second channel; and wherein the first channel includes a first outer sidewall, a first inner sidewall, a first top wall directly interconnecting the first outer sidewall and the first inner sidewall, and a first bottom wall directly interconnecting the first outer sidewall and the first inner sidewall, the first top wall is perpendicular to the first outer sidewall, the first top wall is perpendicular to the first inner sidewall, the first bottom wall is perpendicular to the first outer sidewall, and the first bottom wall is perpendicular to the first inner sidewall.

2. The prismatic battery stack of claim 1, wherein the first channel serves as a first busbar to electrically connect the first cathode tab of the first lithium-ion battery cell to the second cathode tab of the second lithium-ion battery cell, the second channel serves as a second busbar to electrically connect the first anode tab of the first lithium-ion battery cell to the second anode tab of the second lithium-ion battery cell.

3. The prismatic battery stack of claim 2, wherein the first channel further includes a first outer tab and a first inner tab, the first inner tab protrudes directly from the first inner sidewall, the first outer tab protrudes directly from the first outer sidewall, and the first inner tab is parallel to the first outer tab.

4. The prismatic battery stack of claim 3, wherein the first outer tab is directly connected to the first cathode tab of the first lithium-ion battery cell to electrically connect the first cathode tab of the first lithium-ion battery cell to the first channel.

5. The prismatic battery stack of claim 4, wherein the first inner tab is directly connected to the second cathode tab of the second lithium-ion battery cell to electrically connect the second cathode tab of the second lithium-ion battery cell to the first channel.

6. The prismatic battery stack of claim 5, wherein the second lithium-ion battery cell is spaced apart from the first lithium-ion battery cell along a first direction, an entirety of the second channel is spaced apart from an entirety of the first channel along a second direction, the second direction is perpendicular to the first direction, the first top wall is spaced apart from the first bottom wall along a third direction, the third direction is perpendicular to the first direction, and the third direction is perpendicular to the second direction, the first anode tab is spaced apart from the first cathode tab along the second direction, the second anode tab is spaced apart from the second cathode tab along the second direction, the first inner sidewall is spaced apart from the first outer sidewall along the first direction, and the first inner tab is spaced apart from the first outer tab along the second direction.

7. The prismatic battery stack of claim 6, wherein the second channel includes a second outer sidewall, a second inner sidewall, a second top wall directly interconnecting the second outer sidewall and the second inner sidewall, and a second bottom wall directly interconnecting the second outer sidewall and the second inner sidewall, the second top wall is perpendicular to the second outer sidewall, the second top wall is perpendicular to the second inner sidewall, the second bottom wall is perpendicular to the second outer sidewall, and the second bottom wall is perpendicular to the second inner sidewall.

8. The prismatic battery stack of claim 7, wherein the second channel further includes a second inner tab and a second outer tab, the second inner tab protrudes directly from the second inner sidewall, the second outer tab protrudes directly from the second outer sidewall, and the second inner tab is parallel to the first outer tab, the second outer tab is directly connected to the first anode tab of the first lithium-ion battery cell to electrically connect the first anode tab of the first lithium-ion battery cell to the second channel, the second inner tab is directly connected to the second anode tab of the second lithium-ion battery cell to electrically connect the second anode tab of the second lithium-ion battery cell to the second channel.

9. The prismatic battery stack of claim 8, wherein the first outer sidewall of the first channel is closer to the first outer-containment surface of the first lithium-ion battery cell than to the second outer-containment surface of the second lithium-ion battery cell to facilitate heat transfer from the second lithium-ion battery cell to the first channel, and the second outer sidewall of the second channel is closer to the second outer-containment surface of the second lithium-ion battery cell than to the second outer-containment surface of the second lithium-ion battery cell to facilitate heat transfer from the second lithium-ion battery cell to the second channel.

10. The prismatic battery stack of claim 9, wherein the first inner sidewall of the first channel is closer to the first outer-containment surface of the first lithium-ion battery cell than to the second outer-containment surface to facilitate heat transfer from the first lithium-ion battery cell to the first channel, the second inner sidewall of the second channel is closer to the second outer-containment surface of the second lithium-ion battery cell than to the first outer-containment surface of the first lithium-ion battery cell to facilitate heat transfer from the second lithium-ion battery cell to the second channel, the first top wall, the first bottom wall, the first outer sidewall and the first inner sidewall collectively define a first channel body, the first channel further includes a first electrical-insulation film coupled to the first channel body, the second top wall, the second bottom wall, the second outer sidewall and the second inner sidewall collectively define a second channel body, the second channel further includes a second electrical-insulation film coupled to the second channel body, the first channel is characterized by the absence of the first electrical-insulation film on the first outer tab and the first inner tab and the first outer tab, and the second channel is characterized by the absence of the second electrical-insulation film on the second outer tab and the second inner tab.

11. The prismatic battery stack of claim 1, wherein the second lithium-ion battery cell is spaced apart from the first lithium-ion battery cell along a first direction, the first channel includes a first outer sidewall, a first inner sidewall, a first top wall directly interconnecting the first outer sidewall and the first inner sidewall, and a first bottom wall directly interconnecting the first outer sidewall and the first inner sidewall, the first top wall is perpendicular to the first outer sidewall, the first top wall is perpendicular to the first inner sidewall, the first bottom wall is perpendicular to the first outer sidewall, and the first bottom wall is perpendicular to the first inner sidewall, the second channel includes a second outer sidewall, a second inner sidewall, a second top wall directly interconnecting the second outer sidewall and the second inner sidewall, and a second bottom wall directly interconnecting the second outer sidewall and the second inner sidewall, the second top wall is perpendicular to the second outer sidewall, the second top wall is perpendicular to the second inner sidewall, the second bottom wall is perpendicular to the second outer sidewall, and the second bottom wall is perpendicular to the second inner sidewall, the second top wall is spaced apart from the first top wall along a second direction, the second direction is perpendicular to the first direction, the first cathode tab is spaced apart from the first anode tab along a third direction, and the third direction is perpendicular to the first direction, the third direction is perpendicular to the second direction, and the second cathode tab is spaced apart from the second anode tab along the third direction.

12. The prismatic battery stack of claim 11, wherein the first inner sidewall defines a first upper end and a first lower end opposite the first upper end, the first upper end of the first inner sidewall is directly coupled to the first top wall, the first lower end is directly coupled to the first bottom wall, the first channel has a first maximum height defined from the first upper end to the first lower end of the first inner sidewall along the third direction, the second inner sidewall defines a second upper end and a second lower end opposite the second upper end, the second upper end of the second inner sidewall is directly coupled to the second top wall, the second channel defines a second maximum height defined from the second upper end of the second inner sidewall to the second lower end of the second inner sidewall along the third direction, and the first maximum height is greater than the second maximum height.

13. The prismatic battery stack of claim 12, wherein the first inner sidewall has a first rear end and a first front end opposite the first rear end, the first front end is spaced apart from the first rear end along the second direction, the first channel defines a first maximum length defined from the first rear end of the first inner sidewall to the first front end of the first inner sidewall along the second direction, the second inner sidewall has a second rear end and a second front end opposite the second rear end, the second front end is spaced apart from the second rear end along the second direction, the second channel has a second maximum length defined from the second rear end of the second inner sidewall to the second rear end of the second inner sidewall along the second direction, and the first maximum length is greater than the second maximum length.

14. The prismatic battery stack of claim 13, wherein the second rear end of the second inner sidewall is spaced apart from the first rear end of the first inner sidewall along the second direction, the second front end of the second inner sidewall is spaced apart from the first front end of the first inner sidewall along the third direction, and the second front end of the second inner sidewall is not spaced apart from the first front end of the first inner sidewall along the second direction.

15. The prismatic battery stack of claim 14, wherein the first channel further includes a first outer tab and a first inner tab, the first inner tab protrudes directly from the first inner sidewall, the first outer tab protrudes directly from the first outer sidewall, the first inner tab is parallel to the first outer tab.

16. The prismatic battery stack of claim 15, wherein the second lower end of the second inner sidewall is spaced apart from the first lower end of the first inner sidewall along the third direction.

17. A vehicle, comprising:
a plurality of wheels;
an electric motor coupled to at least one of the plurality of wheels;
a prismatic battery pack electrically connected to the electric motor, wherein the prismatic battery pack includes:
a first lithium-ion battery cell, wherein the first lithium-ion battery cell includes:
a first containment defining a first inner-containment surface and a first outer-containment surface opposite the first inner-containment surface;
a first cathode tab protruding out from the first containment;
a first anode tab protruding out from the first containment;
a second lithium-ion battery cell electrically connected to the first lithium-ion battery cell, wherein the second lithium-ion battery cell includes:
a second containment defining a second inner-containment surface and a second outer-containment surface opposite the second inner-containment surface;
a second cathode tab protruding out from the second containment;
a second anode tab protruding out from the second containment;
a first channel disposed around the first lithium-ion battery cell and the second lithium-ion battery cell;
a second channel disposed around the first lithium-ion battery cell and the second lithium-ion battery cell;
wherein the first channel serves as a first heat sink to allow heat transfer from both the first lithium-ion battery cell and the second lithium-ion battery cell to the first channel;
wherein the second channel serves as a second heat sink to allow heat transfer from both the first lithium-ion battery cell and the second lithium-ion battery cell to the second channel;
wherein the first channel serves as a first busbar to electrically connect the first cathode tab of the first lithium-ion battery cell to the second cathode tab of the second lithium-ion battery cell;
wherein the second channel serves as a second busbar to electrically connect the first anode tab of the first lithium-ion battery cell to the second anode tab of the second lithium-ion battery cell; and
wherein the first channel includes a first outer sidewall, a first inner sidewall, a first top wall directly interconnecting the first outer sidewall and the first inner sidewall, and a first bottom wall directly interconnecting the first outer sidewall and the first inner sidewall, the first top wall is perpendicular to the first outer sidewall, the first top wall is perpendicular to the first inner sidewall, the first bottom wall is perpendicular to the first outer sidewall, and the first bottom wall is perpendicular to the first inner sidewall.

18. The vehicle of claim 17, wherein the first channel further includes a first outer tab and a first inner tab, the first inner tab protrudes directly from the first inner sidewall, the first outer tab protrudes directly from the first outer sidewall, and the first inner tab is parallel to the first outer tab, and the first outer tab is directly connected to the first cathode tab of the first lithium-ion battery cell to electrically connect the first cathode tab of the first lithium-ion battery cell to the first channel.

\* \* \* \* \*